US010271529B2

(12) United States Patent
Numata

(10) Patent No.: US 10,271,529 B2
(45) Date of Patent: Apr. 30, 2019

(54) FISHING REEL

(71) Applicant: Shimano Inc., Sakai, Osaka (JP)

(72) Inventor: Fumihide Numata, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 202 days.

(21) Appl. No.: 15/394,394

(22) Filed: Dec. 29, 2016

(65) Prior Publication Data

US 2017/0208789 A1 Jul. 27, 2017

(30) Foreign Application Priority Data

Jan. 22, 2016 (JP) .................................. 2016-010629

(51) Int. Cl.
A01K 89/01 (2006.01)
A01K 89/0155 (2006.01)
A01K 89/017 (2006.01)
A01K 89/015 (2006.01)
A01K 89/033 (2006.01)
H02K 7/18 (2006.01)
(Continued)

(52) U.S. Cl.
CPC ...... *A01K 89/01555* (2013.01); *A01K 89/017* (2013.01); *A01K 89/0182* (2015.05); *A01K 89/0183* (2015.05); *A01K 89/033* (2013.01); *H02K 7/1861* (2013.01); *H02K 11/26* (2016.01); *G09G 3/36* (2013.01)

(58) Field of Classification Search
CPC .......... A01K 89/01555; A01K 89/0182; A01K 89/01931; G09G 3/36; H02K 11/26; H02K 7/1807; H02H 3/20; H02J 7/1415
See application file for complete search history.

(56) References Cited

U.S. PATENT DOCUMENTS

2013/0107410 A1* 5/2013 Rolli ................. G01R 27/2694
361/91.1
2014/0110516 A1* 4/2014 Niitsuma ......... A01K 89/01555
242/288

(Continued)

FOREIGN PATENT DOCUMENTS

JP 2004208630 A 7/2004
JP WO2015/098937 * 7/2015 ............... H02H 9/04
JP 02015144542 A * 8/2015 ............... H02H 9/04

*Primary Examiner* — Emmanuel M Marcelo
(74) *Attorney, Agent, or Firm* — United IP Counselors, LLC

(57) ABSTRACT

A fishing reel configured to forwardly release a fishing line includes a reel unit, a spool rotatably supported by the reel unit, an electric power generator that generates an electric power upon a rotation of the spool, an electric component including a controller, an overvoltage protection circuit, and a bypass circuit. The controller operates using the electric power generated by the electric power generator. The overvoltage protection circuit is electrically connected to the electric power generator and the electric component, the overvoltage protection circuit limits a voltage of the electric power output from the electric power generator to a predetermined magnitude. The bypass circuit supplies the electric power generated by the electric power generator to the electric component by bypassing the overvoltage protection circuit upon a determination that the voltage of the electric power generated by the electric power is less than or equal to a predetermined value.

17 Claims, 12 Drawing Sheets

(51) Int. Cl.
*H02K 11/26* (2016.01)
*G09G 3/36* (2006.01)

(56) References Cited

U.S. PATENT DOCUMENTS

| | | | |
|---|---|---|---|
| 2014/0110517 A1* | 4/2014 | Niitsuma | A01K 89/01555 242/288 |
| 2016/0164274 A1* | 6/2016 | Dawley | H02H 3/22 361/89 |
| 2016/0233663 A1* | 8/2016 | Bhattad | H02H 3/202 |

* cited by examiner

FISHING REEL

CROSS-REFERENCE TO RELATED APPLICATIONS

This application claims priority to Japanese Patent Application No. 2016-010629 filed on Jan. 22, 2016, the entirety of which is hereby incorporated by reference in its entirety.

BACKGROUND

Technical Field

The present disclosure relates to a fishing reel, and particularly to a fishing reel that generates electric power by rotation of a spool.

Background Information

As a type of fishing reel, there has been known a dual-bearing reel that performs dynamic braking by generating electric power and braking a spool with the generated electric power and simultaneously controls a braking force with the generated electric power, during a casting in which the spool is rotated at high speed in a fishing line releasing direction (see e.g., Japan Laid-open Patent Application Publication No. 2004-208630). In the well-known dual-bearing reel, a brake mechanism includes a magnet that unitarily rotates with the spool and a plurality of coils disposed in the surroundings of the magnet. The magnet has a plurality of magnetic poles arranged in alignment in a rotational direction. The plural coils are disposed in alignment in the rotational direction. In the well-known dual-bearing reel, a controller adjusts the braking force by controlling a duty cycle through pulse width modulation to be performed for electric current to be generated and to flow through the coils.

In a well-known mechanism for dynamic braking, there can be a concern that when the rotational velocity of the spool gets fast, voltage rises and exceeds the upper limit allowable for an electric component including a control circuit. To prevent this, an overvoltage protection circuit between the electric component and an electric power generator can be installed. However, in installation of the overvoltage protection circuit, there can be a concern that sufficient operating voltage cannot be reliably obtained while the spool is rotated at a low velocity and accordingly the electric component unstably operates.

BRIEF SUMMARY

It is an object of the present disclosure to, in a fishing reel that makes a controller operate with electric power generated by power generation, make an electric component including the controller stably operate both when the voltage of the generated electric power is high and when the voltage of the generated electric power is low.

A fishing reel according to the present disclosure is a type of fishing reel that forwardly releases a fishing line. The fishing reel includes a reel unit, a spool, an electric power generator, an electric component, a rotation detector, an overvoltage protection circuit and a bypass circuit. The spool is supported by the reel unit so as to be rotatable in a fishing line winding direction and a fishing line releasing direction. The electric power generator generates an electric power when the spool is rotated at least in the fishing line releasing direction. The electric component includes a controller. The controller operates with the electric power generated by the electric power generator. The rotation detector is provided for detecting a rotational velocity of the spool. The overvoltage protection circuit is mounted between the electric power generator and the electric component, and protects the electric component from an overvoltage caused by the electric power generated by the electric power generator. The bypass circuit is mounted between the electric power generator and the electric component. The bypass circuit includes a switch. The switch switches the bypass circuit from an on state to an off state in accordance with an increase in the electric power outputted from the electric power generator. When switched into the on state, the bypass circuit allows electric conduction between the electric power generator and the electric component though the bypass circuit. Contrarily, when switched into the off state, the bypass circuit blocks electric conduction between the electric power generator and the electric component though the bypass circuit.

In the fishing reel, when the rotational velocity of the spool increases and thereby the voltage of the generated electric power rises, the bypass circuit is switched from the on state to the off state by the switch and the electric power of the electric power generator is supplied to the electric component including the controller through the overvoltage protection circuit. Contrarily, when the rotational velocity of the spool decreases and thereby the voltage of the generated electric power lowers, the bypass circuit is switched from the off state to the on state by the switch, and the electric power of the electric power generator is supplied to the electric component including the controller through the bypass circuit. The bypass circuit herein provided is switched from the on state to the off state in accordance with an increase in the electric power outputted from the electric power generator. Hence, either the overvoltage protection circuit or the bypass circuit is selected in accordance with the rotational velocity of the spool. With this configuration, when the voltage of generated electric power is high, the generated electric power can be supplied to the electric component including the controller through the overvoltage protection circuit to limit the voltage of the generated electric power. By contrast, when the voltage of generated electric power is low, the generated electric power can be supplied to the electric component including the controller through the bypass circuit to not limit the voltage of the generated electric power. Therefore, the electric component including the controller stably operates both when the voltage of generated electric power is high and when the voltage of generated electric power is low.

The electric power generator can include at least one magnet and a plurality of coils. The at least one magnet can be coupled to the spool in a unitarily rotatable state, and can have a plurality of magnetic poles aligned in a rotational direction of the spool. The plurality of coils can be disposed in opposition to the at least one magnet and aligned in the rotational direction. According to this construction, electric power can be easily generated by the rotation of the spool.

The electric power generator can be a spool brake that brakes the spool when the spool is rotated at least in the fishing line releasing direction. The controller can control the spool brake. According to this configuration, the electric component stably performs a brake action both when the voltage of the generated electric power is high and when the voltage of the generated electric power is low.

The controller can control and cause the spool brake to brake the spool with a maximum braking force when the rotational velocity detected by the rotation detector has a greater value than an allowable rotational velocity at which the voltage of the electric power has a chance of exceeding an allowable value for the electric component. According to this configuration, by braking the spool with the maximum braking force, the amount of electric current output from the electric power generator increases, and thereby, the rotational velocity of the spool decreases. Accordingly, the voltage of the generated electric power decreases and malfunctioning becomes unlikely to occur in the electric component including the overvoltage protection circuit. In other words, the electric component including the overvoltage protection circuit stably operates.

The fishing reel can further include an operating mechanism that operates with the electric power generated by the electric power generator. The controller can control the operating mechanism. According to this construction and configuration, the controller controls the operating mechanism such that the operating mechanism stably operates both when the voltage of the generated electric power is high and when the voltage of the generated electric power is low.

The operating mechanism can be a display that displays a water depth of a terminal tackle attached to a tip of the fishing line wound about the spool. The controller can control a display action of the display. According to this configuration, the controller stably controls the display action of the display both when the voltage of the generated electric power is high and when the voltage of the generated electric power is low.

The fishing reel can further include an electric storage element that stores the electric power generated by the electric power generator and supplies the stored electric power to the controller and the rotation detector. According to this construction, electric power can be stored in the electric storage element. Hence, even when the electric power generator stops generating electric power, the control action can be maintained until the electric storage element becomes incapable of supplying electric power.

Overall, according to the present disclosure, in a fishing reel that makes an electric component including a controller operate with electric power generated by power generation, the electric component stably operates both when the voltage of the generated electric power is high and when the voltage of the generated electric power is low. It should be noted that in the present disclosure, each of the expressions "when the voltage of the generated electric power is high" and "when the voltage of the generated electric power is low" indicates a range of voltage at which an electric circuit has chances of abnormally operating in comparison with a range of voltage at which the electric circuit is enabled to normally operate.

BRIEF DESCRIPTION OF THE DRAWINGS

Referring now to the attached drawings which form a part of this original disclosure.

DETAILED DESCRIPTION OF EMBODIMENTS

First Preferred Embodiment

<Entire Construction>

Figure 1:
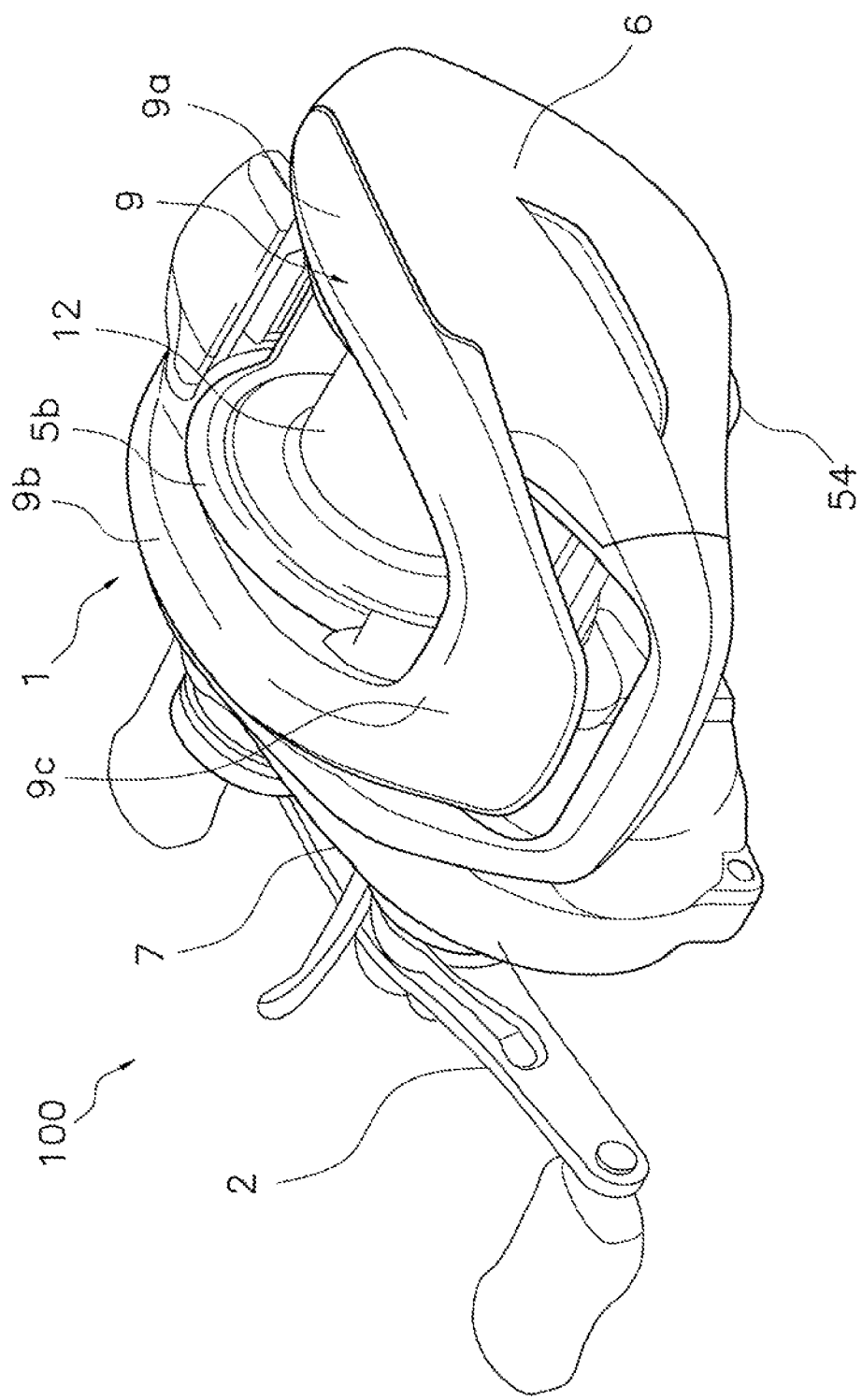
FIG. 1 is a perspective view of a dual-bearing reel employing a first preferred embodiment of the present disclosure.

As shown in FIGS. 1, 2, 3 and 7, a dual-bearing reel 100 is a compact bait-casting reel and is provided as a fishing reel according to a first preferred embodiment of the present disclosure. The dual-bearing reel 100 includes a reel unit 1, a handle 2, a spool 12, an electric power generator 14, an electric component 18 (see FIG. 7), a rotation detector 31 (see FIG. 7), an overvoltage protection circuit 33 (see FIG. 7) and a bypass circuit 35 (see FIG. 7).

<Reel Unit>

The reel unit 1 includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

Figure 2:
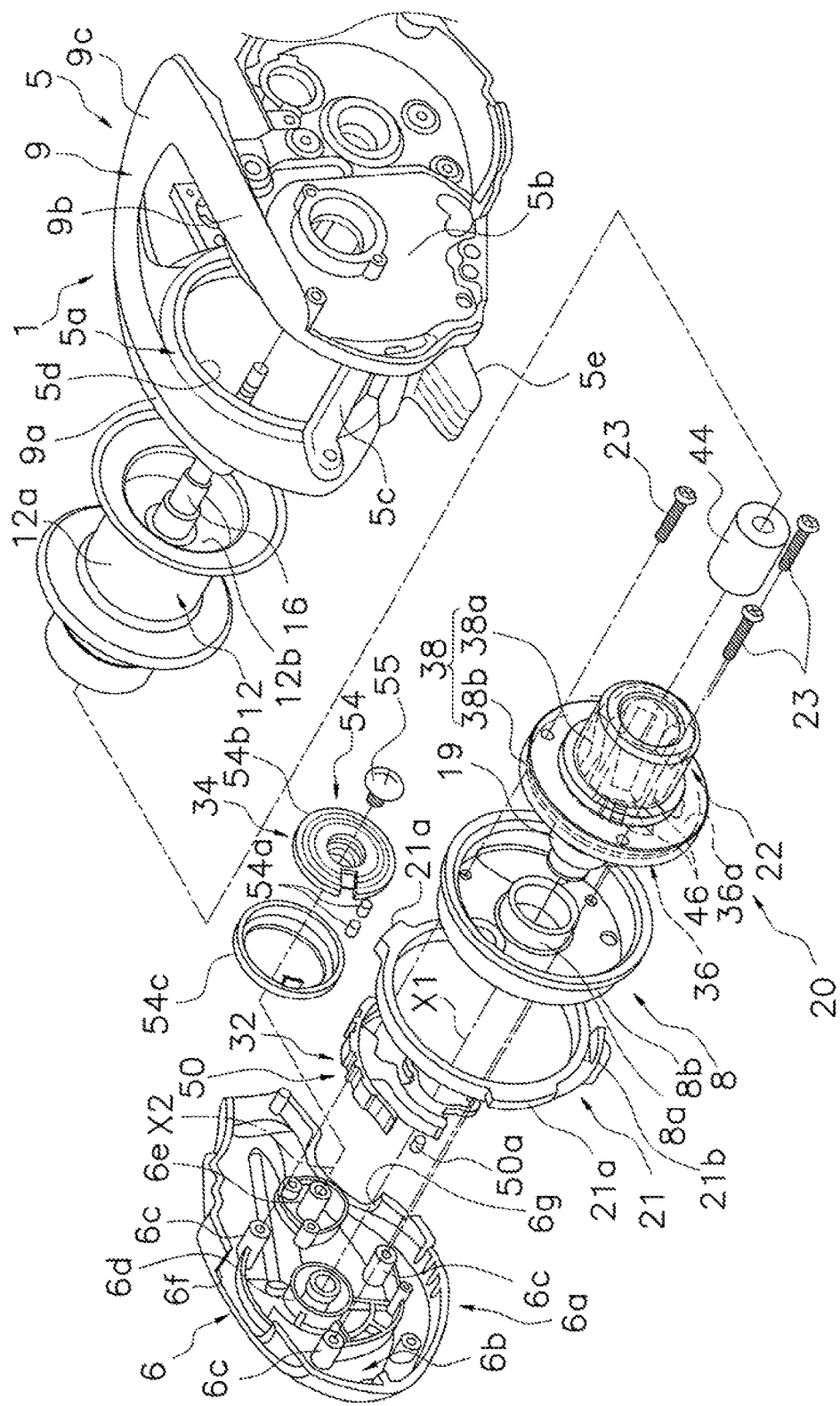
FIG. 2 is an exploded perspective view of the dual-bearing reel including a spool brake mechanism according to the first preferred embodiment.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is opposed to the first side plate 5a. The coupling portions 5c couple the first side plate 5a and the second side plate 5b. The first side plate 5a includes a circular opening 5d enabling the spool 12 to pass through the first side plate 5a. Among the plural coupling portions 5c, the one coupling the first side plate 5a and the second side plate 5b on the bottom side is provided with a fishing rod attachment leg 5e to be attached to a fishing rod. The spool brake mechanism 20 is detachably mounted to a position about the opening 5d on the first side plate 5a of the frame 5. The first side cover 6 is detachably mounted to the first side plate 5a of the frame 5. The first side cover 6 includes a cover body 6a and a shaft support portion 8 mounted to an inner surface 6b of the cover body 6a.

A plurality of (e.g., three) fixation bosses 6c are provided on the inner surface 6b of the cover body 6a so as to fix the shaft support portion 8 to the cover body 6a. Additionally, a first mount boss 6d and a second mount boss 6e are separately provided on the inner surface 6b so as to enable a first selector 32 (to be described) and a second selector 34 (to be described) of the spool brake mechanism 20 to be rotatably mounted to the inner surface 6b. The first mount boss 6d has a tubular shape formed about a first axis X1. The second mount boss 6e has a shape formed about a second axis X2, and the second axis X2 is arranged in parallel to the first axis X1. The second axis X2 is arranged forward of the first axis X1 and adjacently to the fishing rod attachment leg 5e. The first axis X1 is arranged coaxially to a spool shaft 16

(to be described) in a condition that the cover body 6a is mounted to the first side plate 5a.

Figure 4:
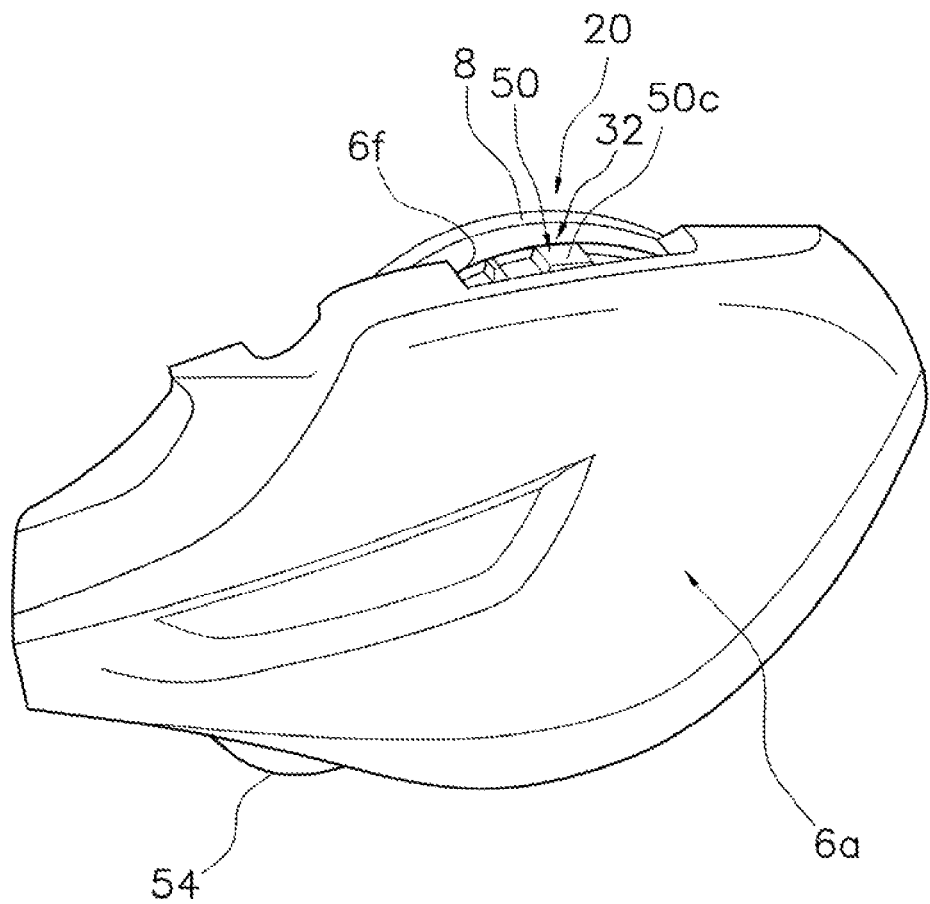
FIG. 4 is a perspective view of the spool brake mechanism.

The cover body 6a is disposed in contact with the thumb rest 9 and is covered with a first bulge 9a (to be described) of the thumb rest 9. The part of the cover body 6a, covered with the first bulge 9a, includes a first opened part 6f. The first opened part 6f has a rectangular shape and enables the first selector 32 to be exposed though the first opened part 6f. Therefore, as shown in FIG. 4, the first selector 32 is inoperable unless the first side cover 6 is detached from the frame 5. The cover body 6a has a second opened part 6g below the second mount boss 6e. The second opened part 6g has a rectangular shape and enables the second selector 34 to outwardly protrude through the second opened part 6g. Therefore, the second selector 34 is operable even when fishing is carried out.

One end of the spool shaft 16 of the spool 12 is rotatably supported by the shaft support portion 8. The shaft support portion 8 is a flat cylindrical member having a partially closed end. The shaft support portion 8 includes a tubular bearing accommodation part 8a in its center. The bearing accommodation part 8a protrudes from the inner surface of the shaft support portion 8 and accommodates a bearing 19 whereby the aforementioned one end of the spool shaft 16 is rotatably supported. An attachment/detachment ring 21 is rotatably mounted to an outer peripheral surface 8b of the shaft support portion 8. The attachment/detachment ring 21 is provided for attaching/detaching the shaft support portion 8 to/from a position about the opening 5d on the first side plate 5a. The attachment/detachment ring 21 detachably attaches the shaft support portion 8 to the first side plate 5a with a conventional bayonet structure. The attachment/detachment ring 21 has a plurality of (e.g., three) pawls 21a and an operation knob 21b. The pawls 21a protrude radially outward from the outer peripheral surface of the attachment/detachment ring 21. The operation knob 21b is provided for performing an attachment/detachment operation. The plural pawls 21a respectively have a slope with a gradually decreasing thickness, and are engaged with a plurality of engaging grooves (not shown in the drawings) provided about the opening 5d.

When the attachment/detachment ring 21 is rotated in one direction (e.g., counterclockwise direction in FIG. 2) by downwardly operating the operation knob 21b with a fingertip, the pawls 21a are disengaged from the engaging grooves, and the shaft support portion 8 and the first side cover 6 are unlocked from the first side plate 5a. Contrarily, when the attachment/detachment ring 21 is rotated in the other direction by, for instance, upwardly operating the operation knob 21b with the fingertip, the pawls 21a are engaged with the engaging grooves, and the shaft support portion 8 and the first side cover 6 are locked to the first side plate 5a. The shaft support portion 8 is fixed to the first side cover 6 together with part of the constituent elements of the spool brake mechanism 20 by a plurality of (e.g., three) bolt members 23. In the condition that the shaft support portion 8 is fixed to the first side cover 6, the attachment/detachment ring 21 is restricted from moving in a spool shaft direction and is rotatable with respect to the shaft support portion 8.

As shown in FIGS. 1 and 2, the thumb rest 9 includes the first bulge 9a, a second bulge 9b and a third bulge 9c. The first bulge 9a outwardly bulges from the upper part of the first side plate 5a. The second bulge 9b outwardly bulges from the upper part of the second side plate 5b. The third bulge 9c forwardly bulges, and couples the first side plate 5a and the second side plate 5b at the front part of the frame 5.

The handle 2 is rotatably supported by the reel unit 1. The spool 12 is rotatably held by the reel unit 1 and is disposed between the first side plate 5a and the second side plate 5b. Rotation of the handle 2 is transmitted to the spool 12 through a rotation transmission mechanism (not shown in the drawings). A clutch mechanism is mounted to an intermediate part of the rotation transmission mechanism. The clutch mechanism switches the spool 12 between an off state and an on state. In the off state, the spool 12 becomes freely rotatable. In the on state, the rotation of the handle 2 is transmitted to the spool 12.

<Spool>

Figure 3:
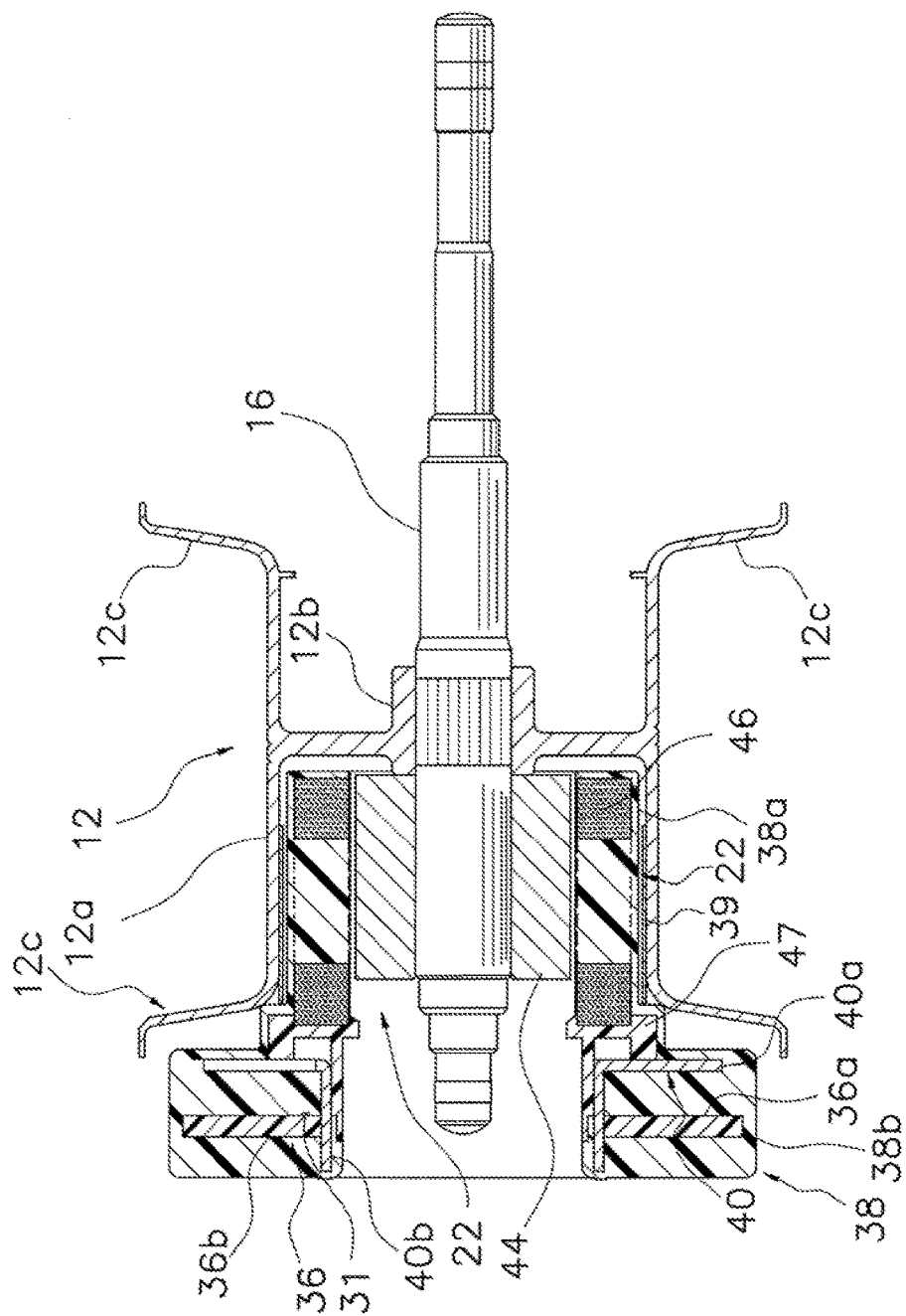
FIG. 3 is a cross-sectional view of a spool brake in a condition that a circuit board and coils are covered with a cover member.

As shown in FIG. 3, the spool 12 includes a bobbin trunk 12a, a tubular part 12b and a pair of flanges 12c. The bobbin trunk 12a is capable of having the fishing line wound about the bobbin trunk 12a. The tubular part 12b is integrated with the bobbin trunk 12a and is fixed onto the spool shaft 16. The flanges 12c are provided on both axial ends of the bobbin trunk 12a and respectively have a large diameter. The spool shaft 16 is coupled to the inner peripheral surface of the tubular part 12b in a unitarily rotatable state. The aforementioned one end of the spool shaft 16 is rotatably supported by the shaft support portion 8 through the bearing 19. The other end of the spool shaft 16 is rotatably supported by the second side cover 7 through a bearing (not shown in the drawings).

<Electric Power Generator>

Figure 7:
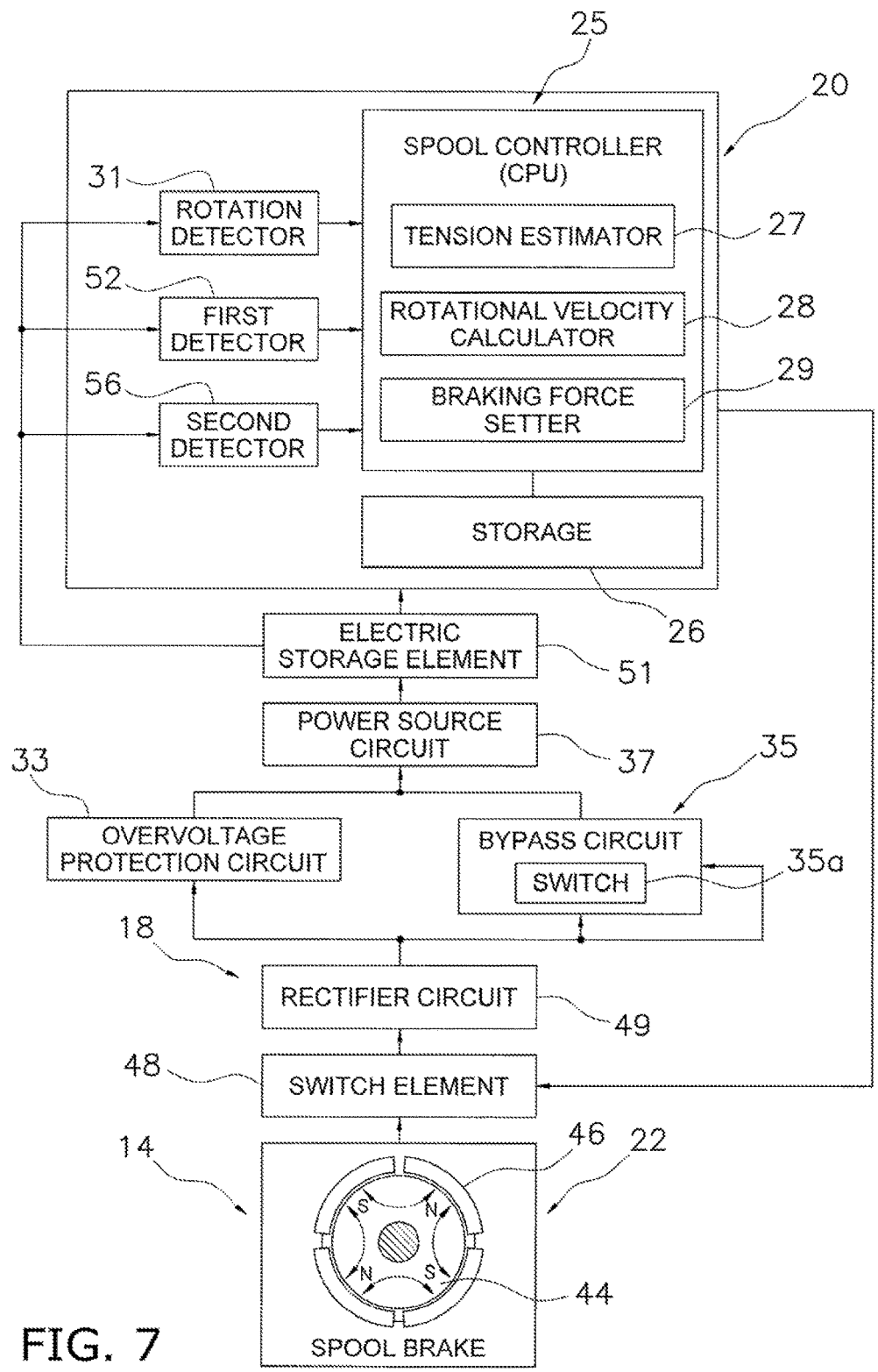
FIG. 7 is a block diagram showing a configuration of the spool brake mechanism.

The electric power generator 14 generates electric power when the spool 12 is rotated at least in the fishing line releasing direction. The electric power generator 14 is an example of an electric power generating means. In the first preferred embodiment, the electric power generator 14 is a spool brake 22 composing part of the spool brake mechanism 20. The spool brake mechanism 22 brakes a rotation of the spool 12 by power generation. As shown in FIGS. 3 and 7, the spool brake mechanism 20 includes the spool brake 22 and a spool controller 25 for controlling the spool brake 22 through the electric component 18. The spool brake 22 is an exemplary electric power generator.

The spool brake 22 brakes the spool 12 in an electrically controllable manner. The spool brake 22 includes at least one magnet 44 mounted to the spool 12 in a unitarily rotatable state and a plurality of coils 46 connected in series. In the first preferred embodiment, the at least one magnet 44 is mounted to the spool shaft 16 in a unitarily rotatable state. In the first preferred embodiment, the at least one magnet 44 is made in the form of a single molded magnet, and is fixed to the spool shaft 16 by adhesion. The magnet 44 is a cylindrical magnet magnetized to have magnetic anisotropy. The magnet 44 has a plurality of magnetic poles arranged in alignment in the rotational direction of the spool 12.

The plural coils 46 are disposed in opposition to the magnet 44. In the first preferred embodiment, the plural coils 46 are disposed on the outer peripheral side of the magnet 44 and are aligned at predetermined intervals in a tubular arrangement. The coils 46 are attached to a circuit board 36 (to be described) through a coil attaching member 47. Coreless coils are herein employed as the plural coils 46 for preventing cogging in order to smoothly rotate the spool 12. Moreover, the coils 46 are not provided with any yoke. Wires of the plural coils 46 are respectively wound in a roughly rectangular shape. The wound wires are opposed to the magnet 44 and are disposed within the magnetic field of the magnet 44. For example, four coils 46 are herein provided. Each of the coils 46 has a circular-arc curved shape. The plural coils 46 are circumferentially disposed at intervals and the entirety of each of the plural coils 46 has a roughly tubular shape. Both ends of the plural coils 46 connected in series are electrically connected to a switch element 48 through a rectifier circuit 49. The rectifier circuit 49 rectifies electric power output from the coils 46 such that an alternating current of the electric power is converted into a direct current. The switch element 48 can turn on and off electric current generated by a relative rotation between the magnet 44 and the coils 46 in the spool brake 22 in accordance with a duty cycle D output from the spool controller 25. In the present preferred embodiment, the switch element 48 is implemented by, for instance, a field effect transistor. The switch element 48 can be on/off controlled by the duty cycle D output by a braking force setter 29.

<Electric Component>

The electric component 18 includes the spool controller 25, a power source circuit 37 and an electric storage element 51. The electric component 18 is an example of an electric power consuming means. The electric component 18 is mounted to the circuit board 36 (to be described). The spool controller 25 is an exemplary controller. The power source circuit 37 includes a voltage reduction regulator and stabilizes rectified electric power from a direct current. The electric storage element 51 is implemented by, for instance, an electrolytic capacitor that stores the rectified electric power of the direct current. The electric storage element 51 stores electric power generated by the coils 46 during a casting. The electric storage element 51 is an example of an electric power storing means. The electric storage element 51 functions as a power source that supplies electric power to the spool controller 25 and the electric component 18 connected to the spool controller 25. The electric storage element 51 is implemented by, for instance, an electrolytic capacitor, a film capacitor, a ceramic capacitor, a paper capacitor, or a battery.

<Rotation Detector>

Figure 5:
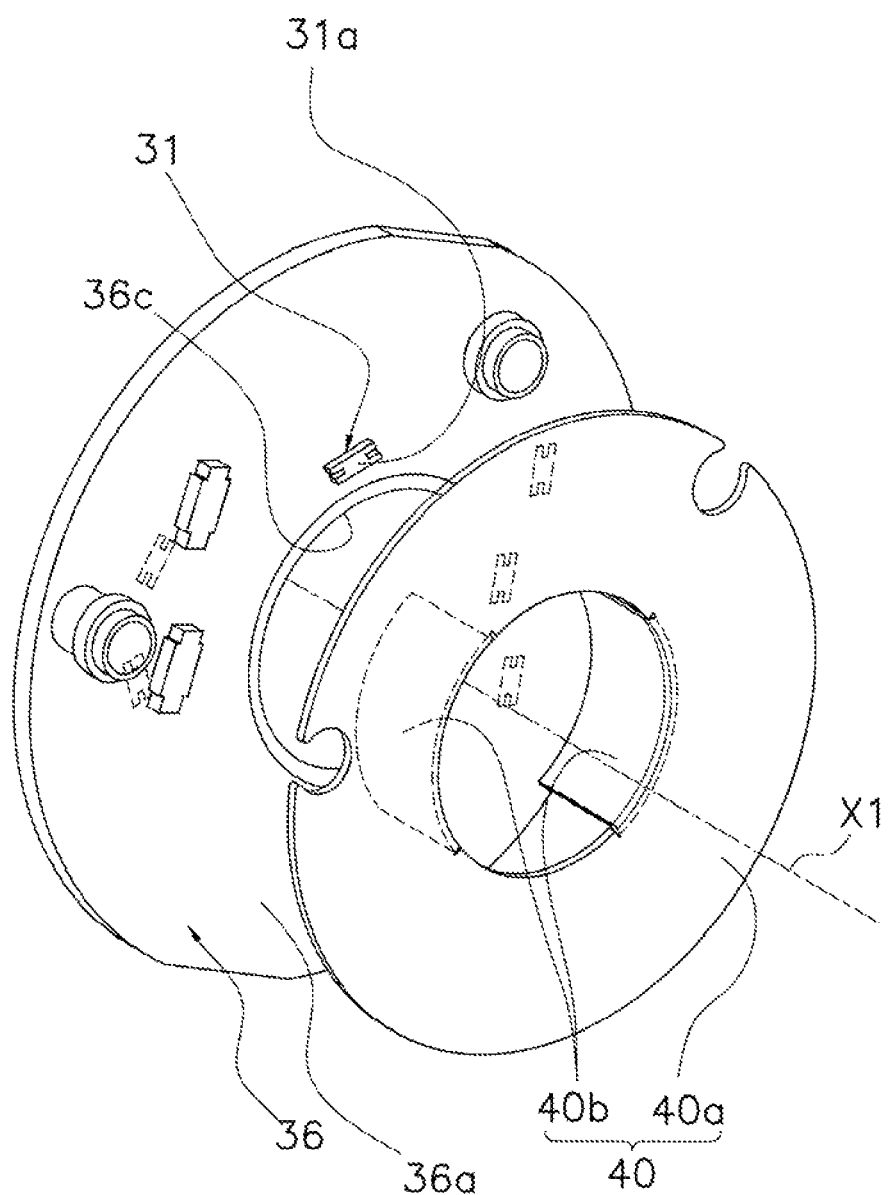
FIG. 5 is an exploded perspective view of the circuit board and a magnetic flux shield member.
Figure 6:
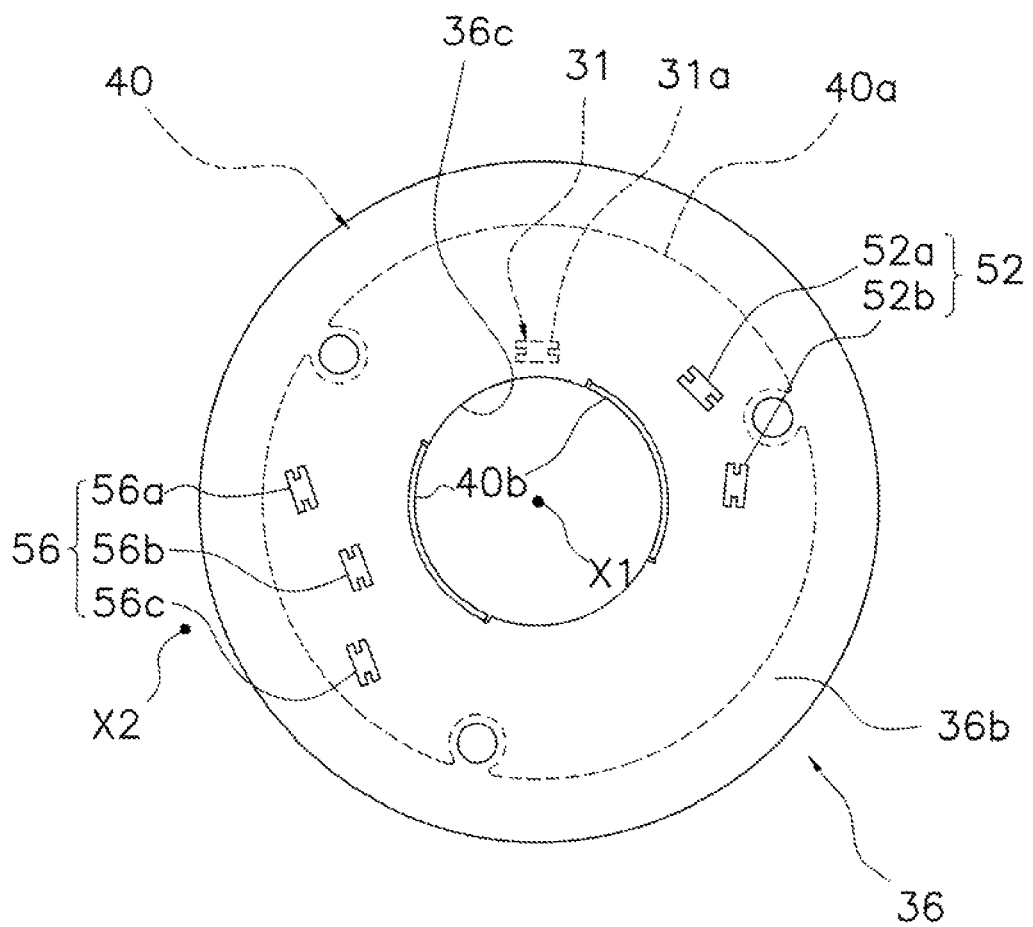
FIG. 6 is a bottom view of the circuit board seen from its second surface side.

The rotation detector 31 is mounted to the circuit board 36. The rotation detector 31 electrically detects the rotation of the spool 12. The rotation detector 31 is an example of a rotation detecting means. As shown in FIGS. 3, 5 and 6, the rotation detector 31 includes a hall element 31a The hall element 31a is mounted to the inner peripheral region of a first surface 36a of the circuit board 36, and is located in a position opposed to a gap between an adjacent two of the four coils 46. The hall element 31a can be a low-cost sensor that only turns on and off in accordance with a plurality of predetermined rotational phases of the magnet 44. The rotation detector 31 is provided for calculating a rotational velocity ω of the spool 12. Additionally, it is possible to calculate a rotational acceleration ωa, and to estimate a tension F acting on the fishing line based on variation in the rotational velocity ω of the spool 12 with time.

<Overvoltage Protection Circuit>

As shown in FIG. 7, the overvoltage protection circuit 33 is disposed between the electric power generator 14 and the electric component 18. The overvoltage protection circuit 33 protects the electric component 18 from overvoltage caused by the electric power generated by the electric power generator 14. Thus, the overvoltage protection circuit 33 is an example of an overvoltage protecting means. The overvoltage protection circuit 33 includes an anti-pulse resistor and a rated voltage diode, for instance, and limits the voltage of the electric power output from the electric power generator 14 to a predetermined magnitude (e.g., a value of 75 volts). In the first preferred embodiment, the overvoltage protection circuit 33 is disposed between the rectifier circuit 49 and the power source circuit 37.

<Bypass Circuit>

The bypass circuit 35 is mounted between the electric power generator 14 and the electric component 18. In the first preferred embodiment, the bypass circuit 35 is mounted in parallel to the overvoltage protection circuit 33. The bypass circuit 35 includes a switch 35a. The switch 35a switches between an on state and an off state in accordance with an increase in an output from the electric power generator 14. In the on state, electric conduction is allowed between the electric power generator 14 and the electric component 18. Contrarily in the off state, electric conduction is blocked between the electric power generator 14 and the electric component 18. Specifically, when the voltage of generated electric power is less than a predetermined magnitude (e.g., a value of 8 volts), the switch 35a is switched into the on state. Contrarily, when the voltage of generated electric power is greater than or equal to the predetermined magnitude, the switch 35a is switched into the off state. The bypass circuit 35 is an example of a bypassing means. The predetermined magnitude of voltage (threshold voltage) is arbitrarily settable. In the first preferred embodiment, the bypass circuit 35 is disposed in parallel to the overvoltage protection circuit 33, and is disposed between the rectifier circuit 49 and the power source circuit 37. When the bypass circuit 35 is switched into the on state, the overvoltage protection circuit 33 is disabled. Contrarily, when the bypass circuit 35 is switched into the off state, the overvoltage protection circuit 33 is enabled.

The spool brake 22 changes the duty cycle D by causing the switch element 48 to switch on and off electric current generated by a relative rotation between the magnet 44 and the coils 46. Accordingly, the spool 12 is braked with a variable magnitude of braking force. The braking force generated by the spool brake 22 can be increased by an increase in a length of a switch-on time by the switch element 48 (i.e., with an increase in a magnitude of the duty cycle D).

As shown in FIG. 7, the spool controller 25 is implemented by a microcomputer including a ROM (such as a PROM, an EPROM, an EEPROM, a Flash EEPROM, an optical memory, a magnetic memory, or a flash memory), a RAM (such as a SDRAM, a DDR SDRAM, or a Rambus DRAM), and a CPU (such as a RISC microprocessor, a CISC microprocessor, an ASIC microprocessor, a Superscalar Processor, or a Digital Signal microprocessor). The CPU of the spool controller 25 can also be a programmable logic device (PLD) such as a programmable logic array device (PLA), a programmable array logic device (PAL), a generic array logic device (GAL), a complex programmable logic device (CPLD), or a field-programmable gate array device (FPGA). The spool controller 25 is an example of a control means. A storage 26 is connected to the spool controller 25. The storage 26 is implemented by a non-volatile memory such as an EEPROM, a ferroelectric RAM, an optical memory, or a flash memory. The rotation detector 31, a first detector 52 and a second detector 56 are electrically connected to the spool controller 25. The rotation detector 31, the first detector 52 and the second detector 56 are implemented at least partially by hardware mounted to the circuit board 36.

The spool controller 25 includes a tension estimator 27, a rotational velocity calculator 28 and the braking force setter 29 as functional constituent elements implemented by software and/or hardware. The rotational velocity calculator 28 calculates the rotational velocity ω of the spool 12 based on an output signal from the rotation detector 31. The tension estimator 27 estimates the tension F acting on the fishing line based on the information outputted from the rotational velocity calculator 28. The braking force setter 29 sets a first duty cycle D1 and a second duty cycle D2. The first duty cycle D1 varies with an elapse of time and is used as a base duty cycle. The second duty cycle D2 is used for correcting the first duty cycle D1.

The tension F can be estimated by a rate of change (Δω/Δt) of the rotational velocity ω of the spool 12 and an inertia moment J of the spool 12. When the rotational velocity ω of the spool 12 varies during a casting, the rotational velocity at this time is different from the rotational velocity of the spool 12 independently and freely rotating without receiving a tension from the fishing line. The difference is attributed to a rotational driving force (i.e., torque) generated by the tension from the fishing line. A driving torque T can be expressed with the following equation (1), where the rate of change of the rotational velocity at this time is set to be (Δω/Δt).

$$T = J \times (\Delta\omega/\Delta t) \qquad (1)$$

When the driving torque T is calculated by the equation (1), the tension F can be estimated with the radius of a point of action of the fishing line (normally 15 to 20 mm). Therefore, in the present preferred embodiment, the tension F can be estimated by a calculation using the rate of change of the rotational velocity ω.

The spool controller 25 changes the braking force (duty cycle D) by performing a duty control for the switch element 48. The spool controller 25 changes the braking force in accordance with the tension F estimated by the tension estimator 27 and a reference tension Fr. The magnitude of the reference tension Fr is set in accordance with a plurality of brake modes. It should be noted that in the present preferred embodiment, the reference tension Fr is set to be "0". The storage 26 stores a plurality of data sets associated with the plurality of brake modes.

Moreover, the spool brake mechanism 20 further includes the rotation detector 31 shown in FIGS. 5 and 7, the first selector 32, the second selector 34, the circuit board 36, a cover member 38, a first magnetic flux shield member 39 and a second magnetic flux shield member 40, which are shown in FIGS. 2, 3 and 4.

The first selector 32 is provided for selecting any one of a plurality of brake modes of the spool brake 22 in accordance with a plurality of types of fishing line or so forth. In the present preferred embodiment, for instance, one of four brake modes is selectable in accordance with one of the types of fishing line being used.

The first selector 32 includes a first selection operating portion 50 and the first detector 52 (see FIGS. 6 and 7). The first selection operating portion 50 includes at least one (e.g., two) first magnet 50*a*. The first detector 52 is opposed to the two first magnets 50*a* and detects the selection position of the first selection operating portion 50.

The first selection operating portion 50 is mounted to the reel unit 1 such that the first selection operating portion 50 is movable within a first range divided into positions corresponding to a plurality of levels. In the present preferred embodiment, the first selection operating portion 50 is rotatably mounted to the inner surface 6*b* of the cover body 6*a* such that the first selection operating portion 50 is settable in, for instance, any one of the positions corresponding to three levels within the first range. The first selection operating portion 50 includes a lever member 50*b* to which the (e.g., two) first magnets 50*a* are mounted. The lever member 50*b* includes a first exposed part 50*c* on its tip. The first exposed part 50*c* curves in a circular-arc shape and includes a plurality of convex parts 50*d*. The convex parts 50*d* are located on the surface of the first exposed part 50*c*, and are circumferentially aligned at intervals. The lever member 50*b* is attached to the outer peripheral surface of the first mount boss 6*d* such that the lever member 50*b* is rotatable about the first axis X1 within the first range. The first range is an angular range of, for instance, 30 degrees or less. In the present preferred embodiment, the first mount boss 6*d* is disposed concentrically to the spool shaft 16. Thus, the first selection operating portion 50 is rotated about the spool shaft 16. In the condition that the first selection operating portion 50 is mounted to the first side cover 6, the first exposed part 50*c* is exposed through the first opened part 6*f* while protruding from the first opened part 6*f*. However, in the condition that the first side cover 6 is mounted to the first side plate 5*a*, the first opened part 6*f* is covered with the thumb rest 9 and thus the first exposed part 50*c* of the first selection operating portion 50 hides in the reel unit 1. With the aforementioned construction, it is possible to avoid a situation that the adjusted condition is changed against a user's intention while fishing.

As shown in FIGS. 5 and 6, the first detector 52 is disposed on an outer peripheral region of a second surface 36*b* of the circuit board 36, and is away from the magnet 44. The first detector 52 includes two hall elements 52*a* and 52*b*. The hall elements 52*a* and 52*b* are disposed on the second surface 36*b* such that they can be opposed to the two first magnets 50*a*. The two hall elements 52*a* and 52*b* can be low-cost elements similarly to the hall element 31*a*, and are disposed about the first axis X1 at an interval away from the first axis X1.

The second selector 34 is provided for selecting any one of a plurality of brake types. The magnitude of braking force to be used as a basis is differently set for the brake types. In the present preferred embodiment, any one of eight brake types is selectable by the second selector 34. The eight brake types are composed of Type 1 to Type 8. In the eight brake types, the magnitude of the braking force increases in the order of Type 1 to Type 8. The second selector 34 includes a second selection operating portion 54 and the second detector 56. The second selection operating portion 54 includes at least one (e.g., three) second magnet 54*a*. The second detector 56 is opposed to three second magnets 54*a* and detects the adjustment position of the second selection operating portion 54.

The second selection operating portion 54 is mounted to the reel unit 1 such that the second selection operating portion 54 is movable within a second range divided into positions corresponding to a plurality of levels. In the present preferred embodiment, the second selection operating portion 54 is rotatably mounted to the inner surface 6*b* of the cover body 6*a* such that the second selection operating portion 54 is settable in, for instance, any one of the positions corresponding to five levels within the second range. The second range is an angular range of, for instance, 120 degrees or less. The second selection operating portion 54 includes an operating portion body 54*b* and a second exposed part 54*c*. The operating portion body 54*b* is a member to which the (e.g., three) second magnets 54*a* are mounted. The second exposed part 54*c* is fixed to the operating portion body 54*b* by, for instance, an elastic coupling. The operating portion body 54*b* is attached to the inner surface 6*b* of the cover body 6*a* by a screw member 55 screwed into the second mount boss 6*e* such that the operating portion body 54*b* is rotatable about the second axis X2. In the condition that the first side cover 6 is mounted to the first side plate 5*a*, the second exposed part 54*c* is exposed through the second opened part 6g. With the aforementioned construction, the position of the second selection operating portion 54 can be adjusted with a fingertip of the user's hand holding the dual-bearing reel 100 on the palm while fishing.

As shown in FIG. 6, the second detector 56 is disposed on the outer peripheral region of the second surface 36b of the circuit board 36, and is away from the magnet 44. The second detector 56 is disposed on the second surface 36b of the circuit board 36, and is away from the first detector 52 substantially at an angular interval of 180 degrees. The second detector 56 includes three hall elements 56a, 56b and 56c. The three hall elements 56a, 56b and 56c are disposed on the second surface 36b of the circuit board 36 such that they can be opposed to the three second magnets 54a. The three hall elements 56a, 56b and 56c can be low-cost elements similarly to the hall element 31a, and are disposed about the second axis X2 at intervals.

The circuit board 36 has a disc shape having a through hole 36c. The circuit board 36 is mounted to one of the surfaces of the shaft support portion 8, i.e., the surface opposed to the spool 12, and is disposed on the outer peripheral side of the bearing accommodation part 8a. The circuit board 36 includes the first surface 36a and the second surface 36b. The first surface 36a is the surface to which the coils 46 are mounted. The second surface 36b is on the opposite side of the first surface 36a. The circuit board 36 is fixed to the first side cover 6 together with the shaft support portion 8, the cover member 38 and the second magnetic flux shield member 40 by the bolt members 23.

As shown in FIGS. 2 and 5, the cover member 38 is a stepped tubular member made of synthetic resin and is provided for insulating the circuit board 36, the coils 46 and the electric component 18 mounted to the circuit board 36. The cover member 38 includes a first cover part 38a and a second cover part 38b. The first cover part 38a covers the tips, the inner peripheral parts and the outer peripheral parts of the plural coils 46. The second cover part 38b is integrated with the first cover part 38a, and covers the outer peripheral part, the inner peripheral part, the first surface 36a and the second surface 36b of the circuit board 36. The first cover part 38a is disposed on the outer peripheral side of the magnet 44. Put differently, the cover member 38 seals the circuit board 36 by covering the entire surface of the circuit board 36 to which the coils 46 and the electric component 18 including the detectors are mounted.

As shown in FIG. 3, the first magnetic flux shield member 39 is mounted to the inner peripheral surface of the bobbin trunk 12a of the spool 12, and is thereby unitarily rotatable with the spool 12. The first magnetic flux shield member 39 is a tubular member made of iron. The first magnetic flux shield member 39 is provided for increasing the magnetic flux density of the magnet 44 in the surroundings of the coils 46. The first magnetic flux shield member 39 is also provided for making the rotation detector 31 unlikely to be affected by the magnetic flux of the magnet 44.

As shown in FIGS. 5 and 6, the second magnetic flux shield member 40 is a circular member made of, for instance, an iron plate. The second magnetic flux shield member 40 is provided for shielding the magnetic flux of the magnet 44 directed toward the first detector 52 and the second detector 56. With the second magnetic flux shield member 40 being provided, the first detector 52 and the second detector 56 can accurately detect the first magnets 50a and the second magnets 54a without being affected by the magnetic flux of the magnet 44. The second magnetic flux shield member 40 is fixed by the bolt members 23 to the first side cover 6 together with the shaft support portion 8 and the circuit board 36 sealed by the cover member 38.

The second magnetic flux shield member 40 includes a first shield part 40a having a ring shape and a pair of second shield parts 40b. The first shield part 40a is fixed to the coil attaching member 47 by, for instance, adhesion. The second shield parts 40b extend from the first shield part 40a, and each has a cross section made in the shape of a circular arc arranged about the first axis X1. The first shield part 40a is opposed to the first surface 36a of the circuit board 36 at an interval away from the first surface 36a of the circuit board 36.

The pair of second shield parts 40b is located at an angular interval of 180 degrees about the first axis X1 so as to prevent the magnetic flux of the magnet 44 from being directed to the first detector 52 and the second detector 56. The second shield parts 40b are disposed in positions opposed to the first detector 52 and the second detector 56. The axial length of each second shield part 40b is such that each second shield part 40b protrudes from the second surface 36b of the circuit board 36 but does not quite reach the first side cover 6—side end surface of the cover member 38. With the aforementioned construction, the magnetic flux of the magnet 44 is prevented from being directed to the first detector 52 and the second detector 56. It should be noted that the second magnetic flux shield member 40 is covered with the cover member 38, and is thus invisible from outside of the dual bearing reel 100.

When using a different type of fishing line from a previously used fishing line, the spool brake mechanism 20, when constructed as described above, requires a detachment of the first side cover 6 from the reel unit 1. Specifically, when the attachment/detachment ring 21 is rotated in one direction (e.g., counterclockwise direction in FIG. 2) by downwardly operating the operating knob 21b disposed in the rear part of the dual-bearing reel 100 with a fingertip, the spool brake mechanism 20, including the circuit board 36, the first side cover 6 and so forth, can be detached from the reel unit 1. This condition is shown in FIG. 4. Consequently, the first selection operating portion 50 of the first selector 32 is exposed through the first opened part 6f. This enables an operation of selecting a suitable brake mode in accordance with the type of fishing line. After this operation is finished, the spool brake mechanism 20 can be reattached to the reel unit 1. During reattachment, the spool brake mechanism 20 contacts the first side plate 5a. Then, when the attachment/detachment ring 21 is rotated in the other direction by, for instance, upwardly operating the operation knob 21b with a fingertip, the spool brake mechanism 20 is attached to the frame 5.

Figure 8:
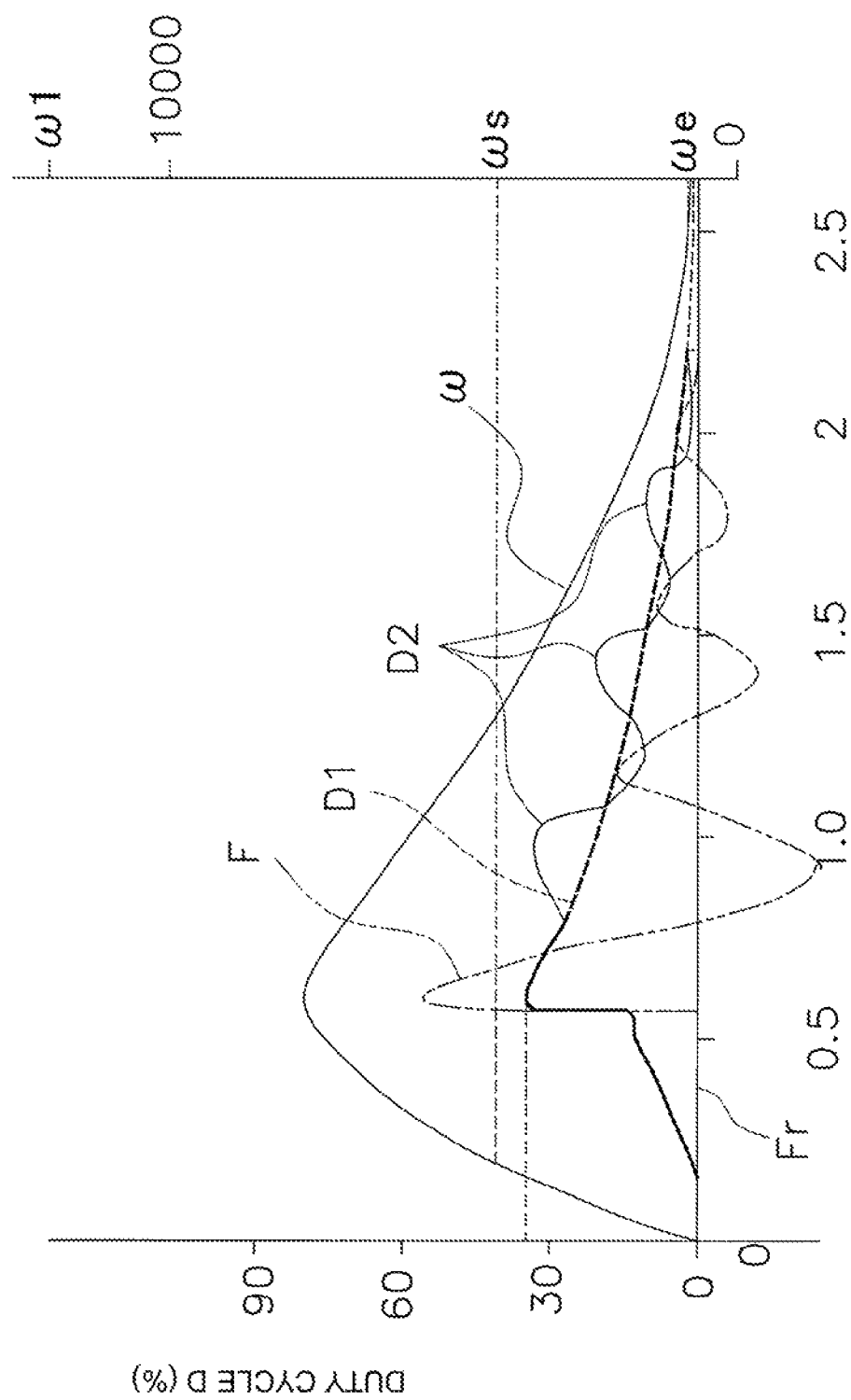
FIG. 8 is a chart for explaining variation in rotational velocity of a spool and braking force during a casting.

Next, a control action performed by the spool controller 25 during a casting will be schematically explained with reference to the chart of FIG. 8. It should be noted that in FIG. 8, an elapse of a time t from a starting of a casting is represented in the horizontal axis, whereas the rotational velocity ω of the spool 12 and the duty cycle D of the braking force are represented in the vertical axis. It should be noted that in the present preferred embodiment, the duty cycle D is determined by the first duty cycle D1 as a base duty cycle and the second duty cycle D2. The first duty cycle D1 gradually reduces with the elapse of the time t from the starting of the casting. The second duty cycle D2 is set for increasing the first duty cycle D1 when the estimated tension F is smaller than the reference tension Fr. Therefore, when the estimated tension F is smaller than the reference tension Fr, the following relation is established: the duty cycle D=D1+D2. Contrarily, when the estimated tension F is greater than or equal to the reference tension Fr, the second duty cycle D2 is set to be "0" and the following relation is established: the duty cycle D=D1.

When the casting is started and the spool 12 is rotated, electric power is supplied to the spool controller 25 from the electric storage element 51 and a spool control is started. When electric power is supplied to the spool controller 25, data of the first duty cycle D1 and data of the second duty cycle D2 are read out of the storage 26 in accordance with a brake mode selected in accordance with the operating position of the first selector 32 and the operating position of the second selector 34, and are set in the spool controller 25. At this time, as depicted with a solid line, the rotational velocity ω of the spool 12 becomes a brake starting velocity ωs in an early stage of the casting. This timing is the timing to start braking. The brake starting velocity ωs falls in a range of, for instance, 4000 to 6000 rpm. In the present preferred embodiment, the brake starting velocity ωs is 4000 rpm.

The spool controller 25 herein calculates the rotational velocity ω and the rotational acceleration ωa based on an output from the rotation detector 31. Based on the calculated rotational acceleration ωa (=Δω/Δt), the spool controller 25 estimates the tension F. Moreover, the spool controller 25 outputs the second duty cycle D2 in accordance with the estimated tension F and the reference tension Fr.

Figure 9:
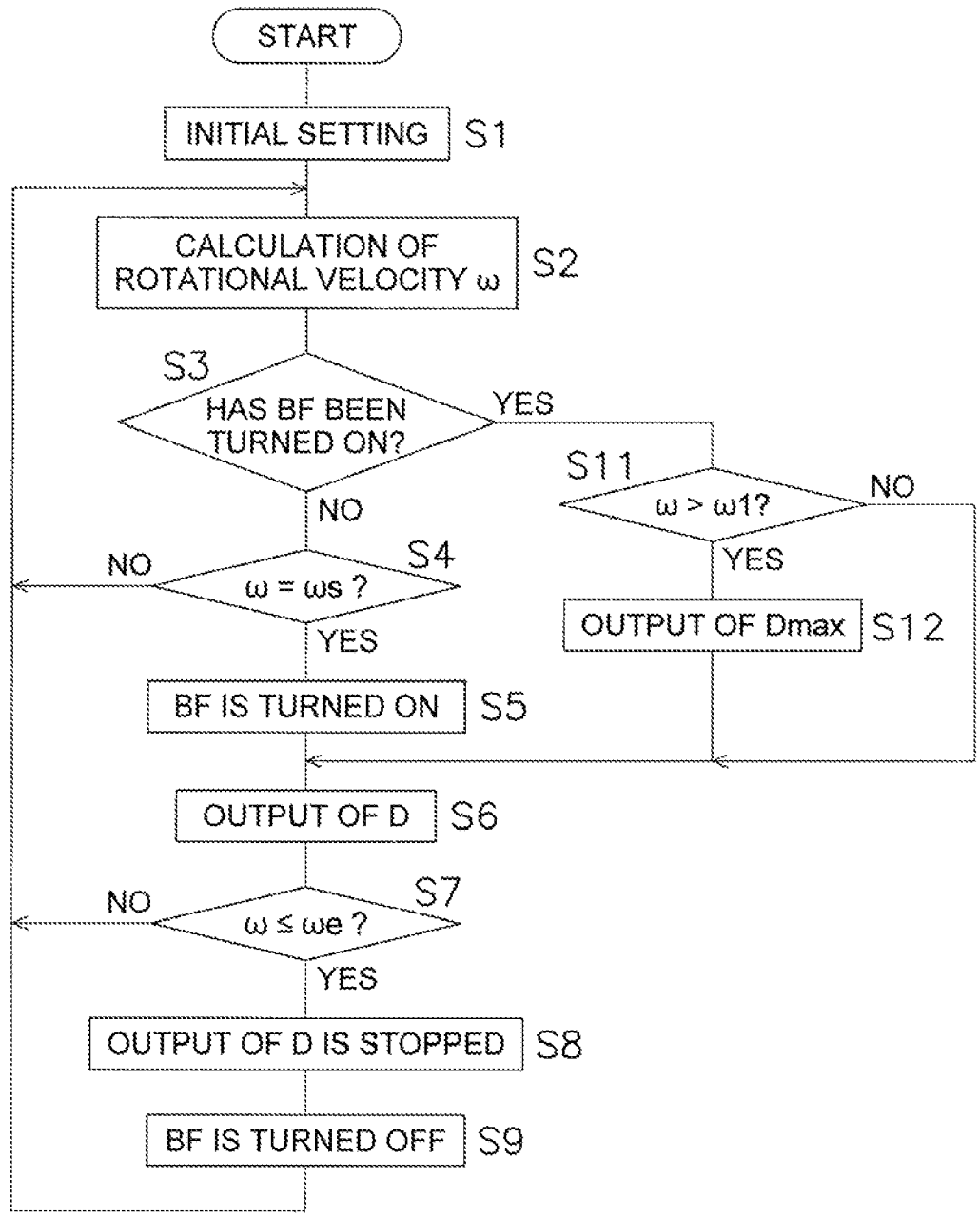
FIG. 9 is a flowchart showing an exemplary control action of a spool controller.

Next, a spool control action of the spool controller 25 will be specifically explained based on the flowchart of FIG. 9. It should be noted that the control flowchart shown in FIG. 9 is an exemplary control action, and the control action of the present disclosure is not limited to this.

When the spool 12 is rotated by the casting, electric power is stored in the electric storage element 51 and is supplied to the spool controller 25. When the voltage of electric power output from the electric storage element 51 exceeds a reset voltage, the spool controller 25 performs an initial setting in step S1 of FIG. 9. Then, the processing proceeds to step S2. In the initial setting, the spool controller 25 resets a variety of items (a flag, a timer, data, etc.). In step S2, the spool controller 25 calculates the rotational velocity ω based on a pulse outputted from the rotation detector 31. Then, the processing proceeds to step S3.

In step S3, the spool controller 25 determines whether or not a braking flag BF has been turned on. The braking flag BF indicates that the brake control has been started. When the spool controller 25 determines that the braking flag BF has not been turned on yet, i.e., that the brake control has not been started yet, the processing proceeds from step S3 to step S4. In step S4, the spool controller 25 determines whether or not the calculated rotational velocity ω has reached the brake starting velocity ωs. When the spool controller 25 determines that the rotational velocity ω has not reached the brake starting velocity ωs yet, the processing proceeds from step S4 to step S2. Contrarily, when the spool controller 25 determines that the rotational velocity ω has reached the brake starting velocity ωs, the processing proceeds from step S4 to step S5. In step S5, the spool controller 25 turns on the braking flag BF. Then, the processing proceeds from step S5 to step S6. In step S6, the spool controller 25 outputs the aforementioned duty cycle D to the switch element 48, and performs the on/off control of the switch element 48 based on the outputted duty cycle D. Then, the processing proceeds from step S6 to step S7.

In step S7, the spool controller 25 determines whether or not the rotational velocity ω of the spool 12 has decreased to be less than or equal to a water landing determining rotational velocity ωe for determining a water landing of a terminal tackle. The water landing determining rotational velocity ωe is, for instance, 2300 rpm. When the spool controller 25 determines that the rotational velocity ω has not decreased to be less than or equal to the water landing determining rotational velocity ωe, the processing proceeds from step S7 to step S2. Contrarily, when the spool controller 25 determines that the rotational velocity ω has decreased to be less than or equal to the water landing determining rotational velocity ωe, the processing proceeds from step S7 to step S8. In step S8, the spool controller 25 stops outputting the duty cycle D. Then, the processing proceeds from step S8 to step S9. In step S9, the spool controller 25 turns off the braking flag BF. Then, the processing proceeds from step S9 to step S2. Subsequently, when the voltage of the output from the electric storage element 51 becomes lower than the reset voltage of the spool controller 25, the spool controller 25 is reset and ends the brake control. When electric power is supplied to the spool controller 25 from the electric power generator 14 during the next casting, the spool controller 25 is restarted and performs the brake control until the output voltage of the electric storage element 51 reaches the reset voltage.

On the other hand, when the spool controller 25 determines that the braking flag BF has been already turned on, the processing proceeds from step S3 to step S11. In step S11, the spool controller 25 determines whether or not the calculated rotational velocity ω has exceeded an allowable rotational velocity ω1. At the allowable rotational velocity ω1, the voltage of electric power has a chance of exceeding a value allowable for the electric component 18. The allowable rotational velocity ω1 falls in a range of, for instance, 30000 to 60000 rpm. In the first preferred embodiment, the allowable rotational velocity ω1 is 50000 rpm. When the rotational velocity ω has exceeded the allowable rotational velocity ω1, a malfunction might occur in the electric component 18 including the overvoltage protection circuit 33. Therefore, when the spool controller 25 determines that the rotational velocity ω has exceeded the allowable rotational velocity ω1, the processing proceeds from step S11 to step S12. In step S12, the spool controller 25 outputs a maximum duty cycle Dmax to the switch element 48 whereby the maximum braking force available at this point of time is obtained. Then, the processing proceeds from step S12 to step S6. As a result, the spool 12 is braked with the maximum braking force, and thereby, the rotational velocity ω of the spool 12 decreases. Accordingly, the voltage of electric power lowers, and the malfunction becomes unlikely to occur in the electric component 18 including the overvoltage protection circuit 33. In other words, the electric component 18 including the overvoltage protection circuit 33 stably operates.

It should be noted that when the electric power generator 14 generates electric power in conjunction with a rotation of the spool 12 and the voltage of the generated electric power becomes greater than or equal to a predetermined magnitude (e.g., a value of 8 volts), as described above, the bypass circuit 35 is turned into the off state whereas the overvoltage protection circuit 33 is enabled.

On the other hand, when the spool controller 25 determines that the rotational velocity ω is less than or equal to the allowable rotational velocity ω1, the processing proceeds from step S11 to step S6.

When the voltage of electric power generated by the electric power generator 14 is high in the former phase of a casting, the electric power can be supplied to the electric component 18 including the spool controller 25 through the overvoltage protection circuit 33 while the voltage of the electric power is limited. On the other hand, when the voltage of electric power generated by the electric power generator 14 is low in the latter phase of casting, the electric power can be supplied to the electric component 18 including the spool controller 25 through the bypass circuit 35 while the voltage of the electric power is not limited. Therefore, the electric component 18 including the controller stably operates both when the voltage of generated electric power is high and when the voltage of generated electric power is low.

Modification of First Preferred Embodiment

In the following explanation, when a given constituent element in a modification of the first preferred embodiment has the same construction as its corresponding one in the first preferred embodiment, a reference sign assigned to the corresponding one will be similarly assigned to the given constituent element and the given constituent element will not be explained. A three-digit reference sign will be assigned to a given constituent element constructed differently from its corresponding one in the first preferred embodiment. Here, the last two digits of the three-digit reference sign correspond to a two-digit reference sign assigned to the corresponding one in the first preferred embodiment.

Figure 10:
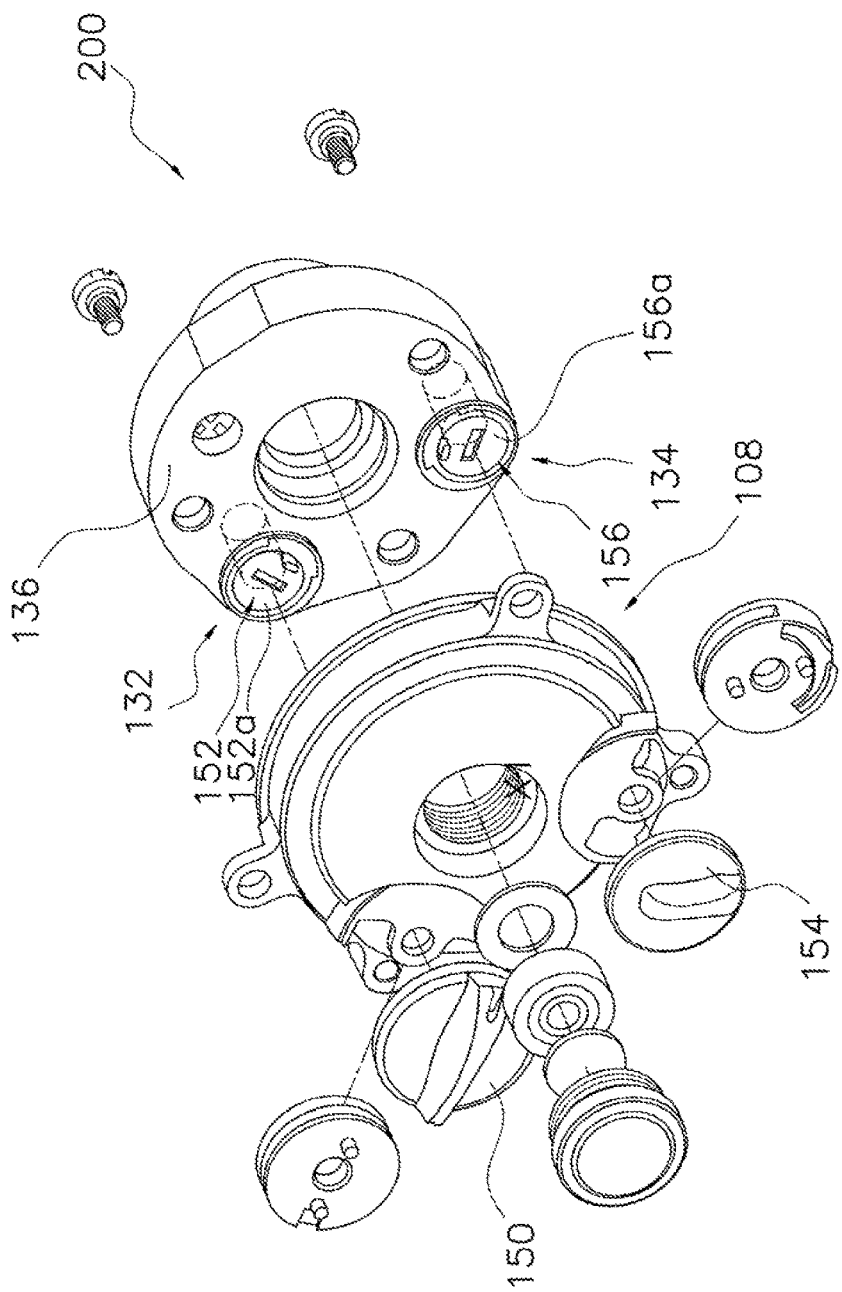
FIG. 10 is a perspective view of a first detector and a second detector according to a modification of the first preferred embodiment.

FIG. 10 shows a dual-bearing reel 200 according to the modification of the first preferred embodiment. In the dual-bearing reel 200, a first selector 132 includes a first detector 152 implemented not by a hall element but by a first rotation detector 152a. A rotation detector (e.g., a potentiometer, a rotary encoder, etc.) is employed as the first rotation detector 152a, and detects the rotational operating position of a first selection operating portion 150. Likewise, a second selector 134 includes a second detector 156 implemented by a second rotation detector 156a. A rotation detector (e.g., a potentiometer, a rotary encoder, etc.) is employed as the second rotation detector 156a, and detects the rotational operating position of a second selection operating portion 154. The first rotation detector 152 and the second rotation detector 156a are other examples of a rotation detecting means. In the modification, potentiometers are used as the first and second rotation detectors 152a and 156a. The first and second rotation detectors 152a and 156a are mounted to a circuit board 136 fixed to a shaft support portion 108.

Second Preferred Embodiment

Figure 11:
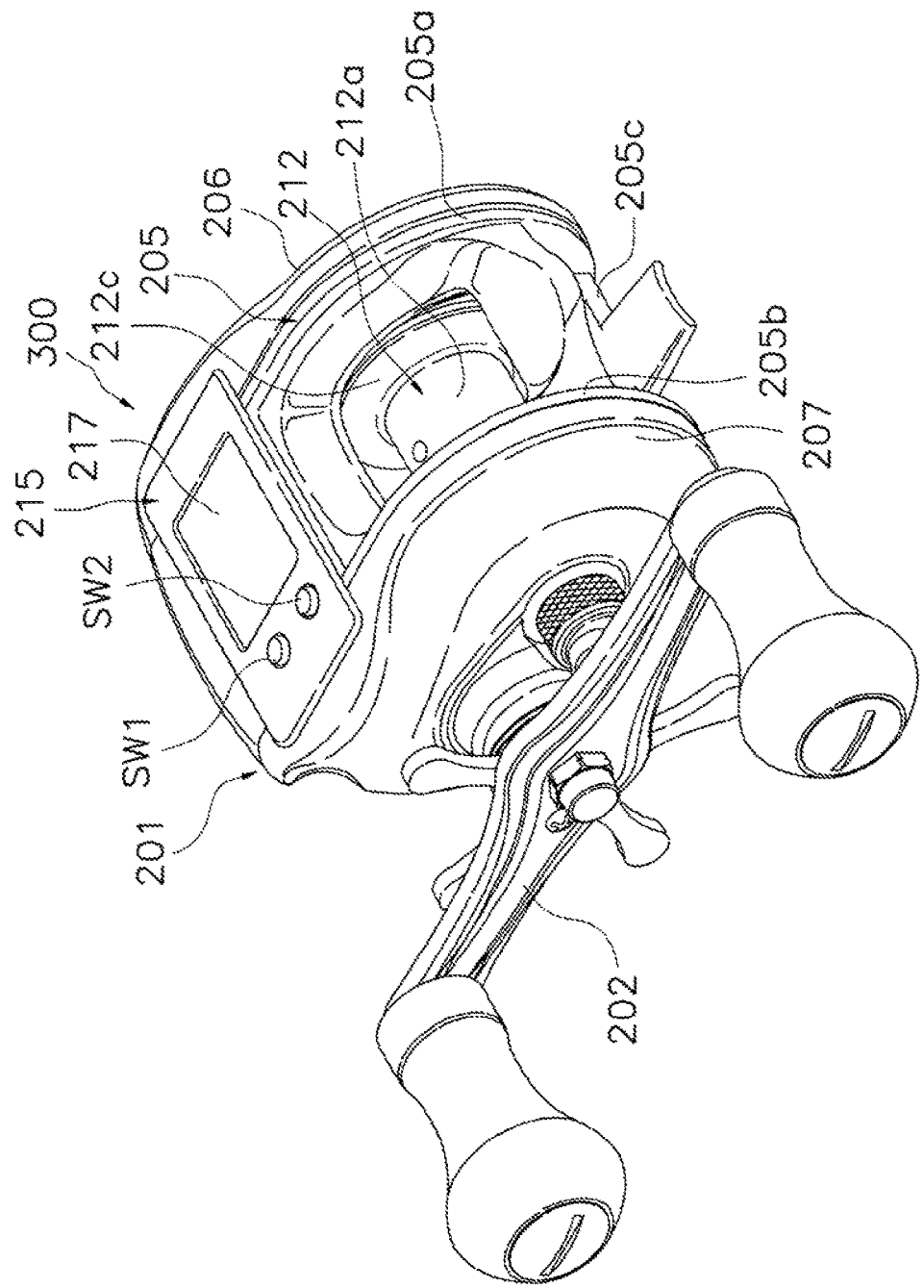
FIG. 11 is a perspective view of a dual-bearing reel employing a second preferred embodiment of the present disclosure.
Figure 12:
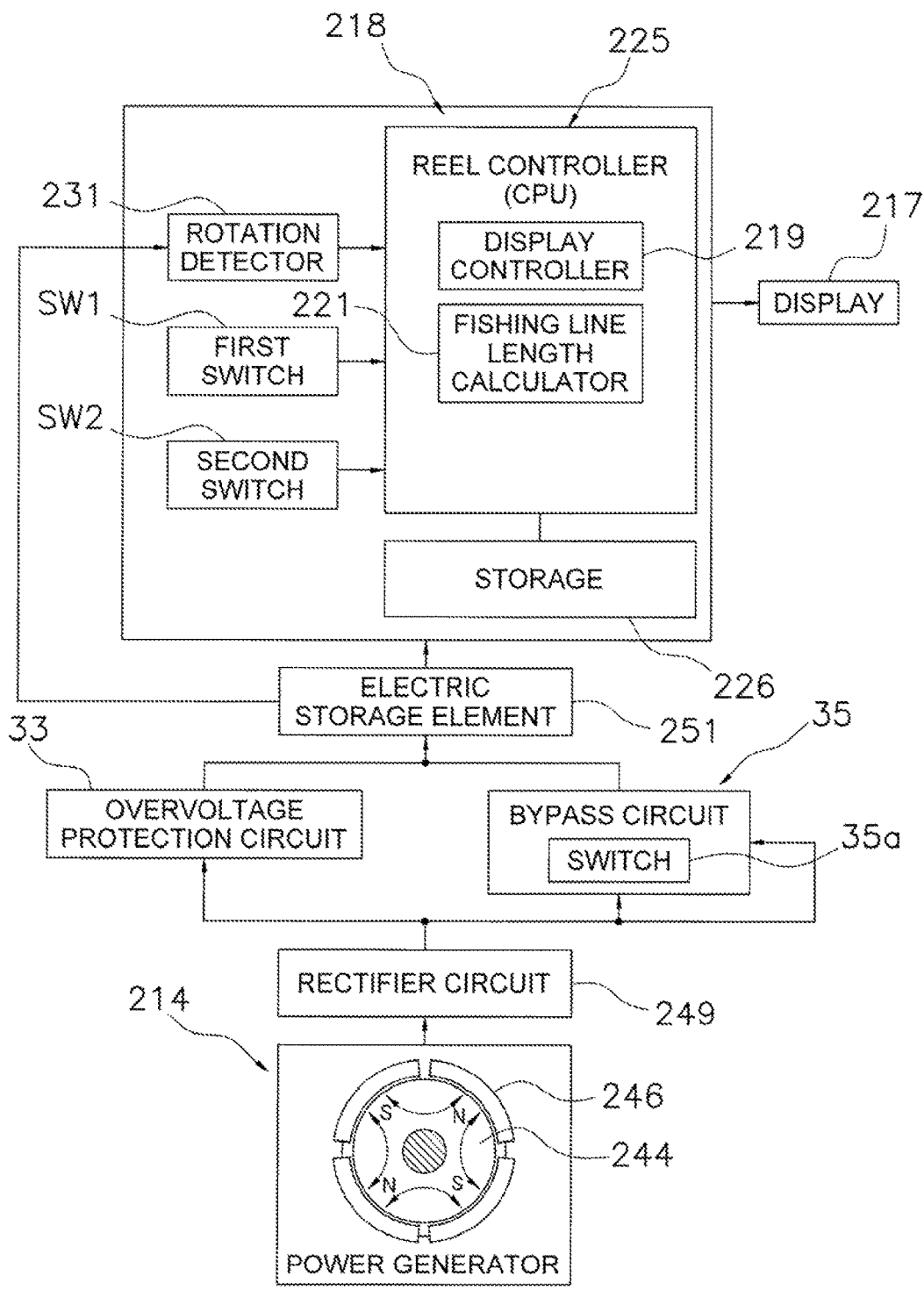
FIG. 12 is a block diagram showing a control configuration of the dual-bearing reel shown in FIG. 11.

FIGS. 11 and 12 show a dual-bearing reel 300 provided as a fishing reel according to a second preferred embodiment of the present disclosure. The dual-bearing reel 300 is a compact left handled reel for boat fishing and has a water depth display function. The dual-bearing reel 300 includes a reel unit 201, a handle 202, a spool 212, an electric power generator 214 (see FIG. 12), an electric component 218, a reel controller 225, a rotation detector 231, the overvoltage protection circuit 33 (see FIG. 12) and the bypass circuit 35 (see FIG. 12).

<Reel Unit>

The reel unit 201 includes a frame 205, a first side cover 206 and a second side cover 207. The frame 205 is an integrally formed component. The first side cover 206 is disposed laterally to the frame 205 on the opposite side of the handle 202. The second side cover 207 is disposed laterally to the frame 205 on the same side as the handle 202. As shown in FIG. 11, the frame 205 includes a first side plate 205a, a second side plate 205b and a plurality of coupling portions 205c. The first side plate 205a is disposed on the opposite side of the handle 202. The second side plate 205b is opposed to the first side plate 205a. The coupling portions 205c couple the first side plate 205a and the second side plate 205b. An electric storage element 251 is disposed in a space between the first side plate 205a and the first side cover 206.

A shaft support portion (not shown in the drawings) is fixed to the inner surface of the first side cover 206. The shaft support portion is constructed similarly to the shaft support portion 8 in the first preferred embodiment. A circuit board (not shown in the drawings) is fixed to the shaft support portion. The shaft support portion in the second preferred embodiment is screwed to the outer surface of the first side plate 205a.

A counter 215 is fixed to an upper part of the reel unit 201. The counter 215 is disposed on the top surface of the front part of the frame 205 and is fixed in an appropriate position. The counter 215 is provided with a display 217 implemented by, for instance, a liquid crystal display. The display 217 is an exemplary operating mechanism. The display 217 displays the depth of a terminal tackle attached to the tip of the fishing line. The display 217 also displays the remaining amount of electric power stored in the electric storage element 251. Additionally, the counter 215 is provided with a first switch SW1 and a second switch SW2. The first switch SW1 turns on/off the display 217 and switches the display mode from a top-down mode to a bottom-up mode. The second switch SW2 sets a shelf position and a ground position and sets the water depth to be "0" when the terminal tackle is disposed on the water surface. Additionally, a variety of operations are enabled by, for instance, a long press of either or both of the first and second switches SW1 and SW2. For example, the display 217 can be turned off by, for instance, a long press of the first switch SW1 for three seconds or greater while the display 217 is being turned on. On the other hand, a user can enter a fishing line winding mode for setting a relationship between the number of rotations of the spool and the length of the fishing line by, for instance, a long press of the first and second switches SW1 and SW2 for three seconds or greater while the display 217 is being turned on.

The handle 202 is rotatably supported on the left side of the reel unit 201 when the dual-bearing reel 300 is seen from behind.

<Spool>

As shown in FIG. 11, the spool 212 is constructed similarly to the spool 12 according to the first preferred embodiment. The spool 212 is rotatably supported by the reel unit 201. The spool 212 includes a bobbin trunk 212a and a pair of flanges 212c. The flanges 212c are provided on both ends of the bobbin trunk 212a and have a large diameter.

<Electric Power Generator>

The electric power generator 214 supplies electric power, generated by relative rotation between a magnet 244 and coils 246, to the electric storage element 251 through a rectifier circuit 249. The electric power generator 214 is another example of an electric power generating means. The electric storage element 251 is, for instance, a rechargeable button cell (e.g., a lithium ion battery). The electric power generator 214 includes the magnet 244 and the coils 246. Similarly to the magnet 44 in the first preferred embodiment, the magnet 244 is fixed to the spool 212. The magnet 244 has a plurality of magnetic poles arranged in the rotational direction of the spool 212. The magnet 244 and the coils 246 are constructed similarly to the magnet 44 and the coils 46 in the first preferred embodiment.

<Electric Component>

The electric component 218 includes the reel controller 225 and the electric storage element 251. The electric component 218 is another example of an electric power consuming means. The electric component 218 is mounted to a circuit board (not shown in the drawings). The reel controller 225 is an exemplary controller. Electric power outputted from the generator 214 is rectified by the rectifier circuit 249 such that its alternating current is converted into direct current. Then, the rectified electric power is stored in the electric storage element 251. The electric storage element 251 is another example of an electric power storing means.

<Rotation Detector>

The rotation detector 231 is mounted to the circuit board. The rotation detector 231 electrically detects the rotation of the spool 212. The rotation detector 231 is another example of a rotation detecting means. Unlike the rotation detector 31 in the first preferred embodiment, the rotation detector 231 is a sensor that obtains the rotational direction of the spool 212, the rotational velocity of the spool 212, and the total number of rotations of the spool 212 from the beginning to the end of winding the fishing line.

The overvoltage protection circuit 33 and the bypass circuit 35 are constructed substantially similarly to those in the first preferred embodiment. The overvoltage protection circuit 33 and the bypass circuit 35 are connected in parallel between the rectifier circuit 249 and the electric storage element 251.

<Reel Controller>

The reel controller 225 is an exemplary controller. As shown in FIG. 12, the reel controller 225 is implemented by a microcomputer including a ROM (such as a PROM, an EPROM, an EEPROM, a Flash EEPROM, an optical memory, a magnetic memory, or a flash memory), a RAM (such as a SDRAM, a DDR SDRAM, or a Rambus DRAM), and a CPU (such as a RISC microprocessor, a CISC microprocessor, an ASIC microprocessor, a Superscalar Processor, or a Digital Signal microprocessor). The CPU of the reel controller 225 can also be a programmable logic device (PLD) such as a programmable logic array device (PLA), a programmable array logic device (PAL), a generic array logic device (GAL), a complex programmable logic device (CPLD), or a field-programmable gate array device (FPGA). The reel controller 225 is another example of a control means. A storage 226 is connected to the reel controller 225. The storage 226 is implemented by a non-volatile memory such as an EEPROM, a ferroelectric RAM, an optical memory, and a flash memory. The rotation detector 231, the first switch SW1, the second switch SW2 and a display 217 implemented by the liquid crystal display are electrically connected to the reel controller 225. The rotation detector 231, the first switch SW1, the second switch SW2 and the display 217 are implemented at least partially by hardware mounted to the circuit board (not shown in the drawings).

The reel controller 225 includes a display controller 219 and a fishing line length calculator 221 as functional constituent elements implemented by software and/or hardware. The reel controller 225 is an exemplary controller. The display controller 219 displays the water depth of the terminal tackle as a result of a calculation by the fishing line length calculator 221. The fishing line length calculator 221 calculates the length of the fishing line to be released from the spool 212 based on the total number of rotations of the spool 212 obtained from an output of the rotation detector 231.

Next, a schematic control action performed by the reel controller 225 in carrying out fishing will be explained. When the fishing line is released by the weight of the terminal tackle, the spool 212 is rotated in the fishing line releasing direction and electric power is stored in the electric storage element 251. At this time, when the voltage of electric power generated by the electric power generator 214 is high, the switch 35a of the bypass circuit 35 is turned into the off state and the overvoltage protection circuit 33 is enabled. Accordingly, the voltage of electric power generated by the electric power generator 214 is restricted to a predetermined magnitude, and an occurrence of a malfunction related to an overvoltage is prevented. Contrarily, when the voltage of electric power generated by the electric power generator 214 is low, the switch 35a of the bypass circuit 35 is turned to the on state and the overvoltage protection circuit 33 is disabled. Accordingly, electric power is efficiently stored in the electric storage element 251.

Similarly to the first preferred embodiment, even in the second preferred embodiment as described above, the electric component 218 including the reel controller 225 can stably operate in both a high output condition and a low output condition of the electric power generator 214.

Other Preferred Embodiments

One preferred embodiment of the present disclosure has been explained above. However, the present disclosure is not limited to the above, and a variety of changes can be made without departing from the scope of the present disclosure. In particular, a plurality of embodiments and modifications described in the present specification can be arbitrarily combined on an as-needed basis.

(a) The first preferred embodiment has exemplified the construction in which the electric power generator 14 is composed of the magnet 44 fixed to the spool shaft 16 and the plural coils 46 that are disposed radially outside in opposition to the magnet 44. However, in the present disclosure, the construction of the electric power generator 14 is not limited to this. For example, the electric power generator can be composed of a plurality of magnets and a plurality of coils. The magnets are herein disposed on the outer lateral surface of at least one flange 12c of the spool 12 and are circumferentially aligned at intervals. On the other hand, the coils are disposed on the reel unit and are opposed to the magnets.

(b) In the aforementioned preferred embodiments, the overvoltage protection circuit 33 can be selected to be disabled or enabled by switching on or off the bypass circuit 35. However, in the present disclosure, the configuration to disable or enable the overvoltage protection circuit 33 is not limited to this. The overvoltage protection circuit can be disabled or enabled by a bypass circuit (function) installed in the overvoltage protection circuit 33.

(c) In the aforementioned preferred embodiments, the switch 35a of the bypass circuit 35 can be directly switched on and off in accordance with the voltage of generated electric power. However, in the present disclosure, the configuration to switch the bypass circuit 35 between the on state and the off state is not limited to this. The voltage of generated electric power is approximately proportional to the rotational velocity of the spool 12. Hence, based on the rotational velocity of the spool 12 to be detected, the bypass circuit can be switched between the on state and the off state by software and/or hardware.

(d) In the aforementioned preferred embodiments, the dual-bearing reel 100 of a manual winding type has been disclosed as the fishing reel of the present disclosure. However, the fishing reel of the present disclosure is not limited to this. The fishing reel can be a single-bearing reel or a dual-bearing reel of an electric type. Additionally, when the fishing reel is a type of dual-bearing reel, the present disclosure can be applied to a drag mechanism.

<Features>

The aforementioned preferred embodiment can be expressed as follows.

(A) The dual-bearing reel 100 is a type of reel that forwardly releases the fishing line. The dual-bearing reel 100 includes the reel unit 1, the spool 12, the electric power generator 14, the electric component 18, the rotation detector 31, the overvoltage protection circuit 33 and the bypass circuit 35. The spool 12 is supported by the reel unit 1 so as to be rotatable in the fishing line winding direction and the fishing line releasing direction. The electric power generator 14 generates an electric power when the spool 12 is rotated at least in the fishing line releasing direction. The electric component 18 includes the spool controller 25. The spool controller 25 operates with the electric power generated by the electric power generator 14. The rotation detector 31 detects the rotational velocity $\omega$ of the spool 12. The overvoltage protection circuit 33 is mounted between the electric power generator 14 and the spool controller 25, and protects the electric component 18 from an overvoltage caused by the electric power generated by the electric power generator 14. The bypass circuit 35 is mounted between the electric power generator 14 and the electric component 18. The bypass circuit 35 includes the switch 35a. The switch 35a switches the bypass circuit 35 between an on state and an off state in accordance with the magnitude of an output from the electric power generator 14. When switched into the on state, the bypass circuit 35 allows electric conduction between the electric power generator 14 and the electric component 18 through the bypass circuit 35. Contrarily, when switched into the off state, the bypass circuit 35 blocks electric conduction between the electric power generator 14 and the electric component 18 through the bypass circuit 35.

In the dual-bearing reel 100, when the rotational velocity $\omega$ of the spool 12 increases and thereby the output from the electric power generator 14 rises, the bypass circuit 35 is switched from the on state to the off state and the electric power of the electric power generator 14 is supplied to the electric component 18 including the spool controller 25 through the overvoltage protection circuit 33. Contrarily, when the rotational velocity $\omega$ of the spool 12 decreases and thereby the output of the electric power generator 14 lowers, the bypass circuit 35 is switched from the off state to the on state, and the electric power of the electric power generator 14 is supplied to the electric component 18 including the spool controller 25 through the bypass circuit 35. The bypass circuit 35 herein provided is switched between the on state and the off state in accordance with the magnitude of the output from the electric power generator 14. Hence, either the overvoltage protection circuit 33 or the bypass circuit 35 is selectable in accordance with the rotational velocity $\omega$ of the spool 12. With this configuration, when the voltage of generated electric power is high, the generated electric power can be supplied to the electric component 18 including the spool controller 25 through the overvoltage protection circuit 33 that limits the voltage of the generated electric power. By contrast, when the voltage of generated electric power is low, the generated electric power can be supplied to the electric component 18 including the spool controller 25 through the bypass circuit 35 which does not limit the voltage of the generated electric power. Therefore, the electric component 18 including the spool controller 25 stably operates both when the voltage of electric power generated by the electric power generator 14 is high and when the voltage of electric power generated by the electric power generator 14 is low.

(B) The electric power generator 14 can include at least one magnet 44 and a plurality of coils 46. The at least one magnet 44 can be coupled to the spool 12 in a unitarily rotatable state, and can have a plurality of magnetic poles aligned in the rotational direction of the spool 12. The plurality of coils 46 can be disposed in opposition to the at least one magnet 44 and aligned in the rotational direction. According to this construction, electric power can be easily generated by the rotation of the spool 12.

(C) The generator 14 can be the spool brake 22 that brakes the spool 12 when the spool 12 is rotated at least in the fishing line releasing direction. The spool controller 25 can control the spool brake 22. According to this configuration, the electric component 18 stably performs a brake action both when the voltage of electric power generated by the electric power generator 14 is high and when the voltage of electric power generated by the electric power generator 14 is low.

(D) The spool controller 25 can control and cause the spool brake 22 to brake the spool 12 with a maximum braking force when the rotational velocity $\omega$ detected by the rotation detector 31 has a greater value than the allowable rotational velocity $\omega 1$ at which the voltage of the electric power has a chance of exceeding an allowable value for the electric component 18. According to this configuration, by braking the spool 12 with the maximum braking force (duty cycle Dmax), the rotational velocity $\omega$ of the spool 12 decreases. Accordingly, the voltage of the generated electric power lowers and a malfunction becomes unlikely to occur in the electric component 18 including the overvoltage protection circuit 33. In other words, the electric component 18 including the overvoltage protection circuit 33 stably operates.

(E) The dual-bearing reel 200 can further include the display 217 that operates with the electric power generated by the electric power generator 214. The reel controller 225 can control the display 217. According to this construction and configuration, the reel controller 225 controls the display 217 such that the display 217 stably operates both when the output of the electric power generator 214 is high and when the output of the electric power generator 214 is low.

(F) The operating mechanism can be the display 217 that displays the water depth of the terminal tackle attached to the tip of the fishing line wound about the spool 212. The display 217 is an example of an operating means. The reel controller 225 can control the display action of the display 217. According to this configuration, the reel controller 225 stably controls the display action of the display 217 both when the output of the electric power generator 214 is high and when the output of the electric power generator 214 is low.

(G) The dual-bearing reel 100 can further include the electric storage element 51 that stores the electric power generated by the electric power generator 14 and supplies the stored electric power to the spool controller 25 and the rotation detector 31. According to this construction, electric power can be stored in the electric storage element 51.

Hence, even when the electric power generator 14 stops generating electric power, the control action can be maintained until the electric storage element 51 becomes incapable of supplying electric power.

What is claimed is:

1. A fishing reel configured to forwardly release a fishing line, the fishing reel comprising:
   a reel unit;
   a spool rotatably supported by the reel unit;
   an electric power generator configured to generate an electric power upon a rotation of the spool;
   an electric component including a controller, the controller configured to operate using the electric power generated by the electric power generator;
   an overvoltage protection circuit electrically connected to the electric power generator and the electric component, the overvoltage protection circuit configured to limit a voltage of the electric power output from the electric power generator to a predetermined magnitude; and
   a bypass circuit configured to supply the electric power generated by the electric power generator to the electric component by bypassing the overvoltage protection circuit upon a determination that the voltage of the electric power generated by the electric power generator is less than or equal to a predetermined value.

2. The fishing reel according to claim 1, wherein the electric power generator includes
   at least one magnet coupled to the spool in a unitarily rotatable state, the at least one magnet having a plurality of magnetic poles aligned in a rotational direction of the spool, and
   a plurality of coils disposed in opposition to the at least one magnet, the plurality of coils aligned in the rotational direction.

3. The fishing reel according to claim 2, wherein
   the electric power generator is a spool brake configured to brake the spool when the spool is rotated at least in a fishing line releasing direction, and
   the controller is configured to control the spool brake.

4. The fishing reel according to claim 3, further comprising:
   a rotation detector configured to detect a rotational velocity of the spool, wherein
   the controller is further configured to control the spool brake to brake the spool with a maximum braking force upon a determination that the rotational velocity detected by the rotation detector is greater than a maximum allowable rotational velocity.

5. The fishing reel according to claim 1, further comprising:
   a display configured to display a water depth of a terminal tackle attached to a tip of the fishing line, which is wound about the spool, wherein
   the controller is further configured to control a display action of the display.

6. The fishing reel according to claim 1, further comprising:
   a rotation detector configured to detect a rotational velocity of the spool; and
   an electric storage element configured to store the electric power generated by the electric power generator and to supply the stored electric power to the controller and the rotation detector.

7. A fishing reel that forwardly releases a fishing line, the fishing reel comprising:
   a reel unit;
   a spool rotatably supported by the reel unit;
   an electric power generator configured to generate an electric power upon a rotation of the spool;
   an electric component configured to operate using the electric power generated by the electric power generator;
   an overvoltage protection circuit that limits a voltage of the electric power output from the electric power generator to the electric component to a predetermined voltage, and supplies the electric power having the predetermined voltage to the electric component; and
   a bypass circuit that electrically connects the electric power generator to the electric component upon a determination that the voltage of the electric power generated by the electric power generator is less than or equal to a threshold voltage, and electrically disconnects the electric power generator from the electric component upon a determination that the voltage of the electric power generated by the electric power generator is greater than the threshold voltage.

8. The fishing reel according to claim 7, wherein the electric power generator includes
   at least one magnet coupled to the spool in a unitarily rotatable state, the at least one magnet having a plurality of magnetic poles aligned in a rotational direction of the spool, and
   a plurality of coils disposed in opposition to the at least one magnet, the plurality of coils aligned in the rotational direction.

9. The fishing reel according to claim 8, wherein
   the electric power generator is a spool brake that brakes the spool when the spool is rotated at least in a fishing line releasing direction, and
   the electric component includes a controller, the controller configured to operate using the electric power generated by the electric power generator and to control the spool brake.

10. The fishing reel according to claim 9, further comprising:
    a rotation detector configured to detect a rotational velocity of the spool, wherein
    the controller is further configured to control the spool brake to brake the spool with a maximum braking force upon a determination that the rotational velocity detected by the rotation detector is greater than a maximum allowable rotational velocity.

11. The fishing reel according to claim 7, further comprising:
    a display configured to display a water depth of a terminal tackle attached to a tip of the fishing line which is wound about the spool, wherein the electric component includes a controller configured to control a display action of the display.

12. The fishing reel according to claim 7, further comprising:
    an electric storage element configured to store the electric power generated by the electric power generator and to supply the stored electric power to the electric component.

13. A fishing reel that forwardly releases a fishing line, the fishing reel comprising:
    a reel unit;
    a spool rotatably supported by the reel unit;
    electric power generating means for generating an electric power upon a rotation of the spool;

electric power consuming means for using the electric power generated by the electric power generating means;

overvoltage protecting means for protecting the electric power consuming means from an overvoltage caused by the electric power generated by the electric power generating means; and bypassing means for electrically connecting the electric power generating means to the electric power consuming means upon a determination that a voltage of the electric power generated by the electric power generating means is less than a threshold voltage.

14. The fishing reel according to claim 13, wherein the electric power consuming means includes control means for controlling the electric power generating means.

15. The fishing reel according to claim 14, further comprising:

rotation detecting means for detecting a rotational velocity of the spool, wherein the control means controls a spool brake to brake the spool with a maximum braking force upon a determination that the rotational velocity detected by the rotation detecting means is greater than a maximum allowable rotational velocity.

16. The fishing reel according to claim 15, further comprising:

operating means for operating the fishing reel using the electric power generated by the electric power generating means, wherein the control means further controls a display action of the operating means.

17. The fishing reel according to claim 15, wherein the electric power consuming means includes electric power storing means for storing the electric power generated by the electric power generating means.

\* \* \* \* \*